United States Patent
Montenot et al.

(10) Patent No.: US 11,129,051 B2
(45) Date of Patent: Sep. 21, 2021

(54) PROXY EQUIPMENT IN A CELLULAR TELECOMMUNICATION SYSTEM

(71) Applicant: Airbus Defence and Space, S.A.S., Toulouse (FR)

(72) Inventors: Jean-Marc Montenot, Balma (FR); Franck Scholler, Saint Germain en Laye (FR); Franck Cibaud, Deuil la Barre (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 126 days.

(21) Appl. No.: 16/349,492

(22) PCT Filed: Nov. 13, 2017

(86) PCT No.: PCT/EP2017/078994
§ 371 (c)(1),
(2) Date: Mar. 19, 2020

(87) PCT Pub. No.: WO2018/087350
PCT Pub. Date: May 17, 2018

(65) Prior Publication Data
US 2020/0374755 A1   Nov. 26, 2020

(30) Foreign Application Priority Data
Nov. 14, 2016  (FR) ...................................... 1660995

(51) Int. Cl.
*H04W 28/08* (2009.01)
*H04W 28/20* (2009.01)
(Continued)

(52) U.S. Cl.
CPC ......... *H04W 28/0808* (2020.05); *H04W 8/18* (2013.01); *H04W 28/0846* (2020.05);
(Continued)

(58) Field of Classification Search
CPC ............. H04W 28/08; H04W 28/0808; H04W 28/0846; H04W 28/0967; H04W 28/20;
(Continued)

(56) References Cited

U.S. PATENT DOCUMENTS 8,305,979 B2 * 11/2012 Manning ............... H04W 28/16
370/329
8,675,567 B2 * 3/2014 Lovsen ................ H04W 76/19
370/328
(Continued)

FOREIGN PATENT DOCUMENTS

FR         2943885 A1     10/2010

OTHER PUBLICATIONS

International Search Report for International Patent Application No. PCT/EP2017/078994 dated Jan. 25, 2018.

*Primary Examiner* — Ahmed Elallam
(74) *Attorney, Agent, or Firm* — Greer, Burns & Crain, Ltd.

(57) ABSTRACT

A cellular telecommunication system comprises a radio access part comprising a plurality of base stations that can be offset by wireless connection, as well as a core network part comprising quality-of-service policy control equipment connected via a first connection to a gateway via which radio bearers are set up. Proxy equipment: intercepts, on said first connection, each session establishment or session update message; when the intercepted message does not concern a radio bearer involving a base station offset by wireless connection, propagates the message to its destination. Otherwise the proxy equipment: determines a remaining bandwidth via said wireless connection; when the remaining bandwidth covers a bandwidth requirement expressed in the intercepted message, propagates the message to its destination; and otherwise modifies the message by indicating a (Continued)

bandwidth requirement of no more than the remaining bandwidth.

15 Claims, 8 Drawing Sheets

(51) Int. Cl.
  *H04W 28/24* (2009.01)
  *H04W 28/12* (2009.01)
  *H04W 8/18* (2009.01)
  *H04W 76/12* (2018.01)
  *H04W 88/16* (2009.01)

(52) U.S. Cl.
  CPC ....... *H04W 28/0967* (2020.05); *H04W 28/20* (2013.01); *H04W 28/24* (2013.01); *H04W 76/12* (2018.02); *H04W 88/16* (2013.01)

(58) Field of Classification Search
  CPC ..... H04W 28/24; H04W 76/12; H04W 88/16; H04W 8/18; H04W 24/08; H04W 24/02; H04W 28/0247; H04W 28/0252; H04W 28/0268; H04M 15/66; H04M 15/07; H04L 41/0896; H04L 43/0882; H04L 43/16; H04L 67/322; H04L 67/2814; H04L 67/327
  See application file for complete search history.

(56) References Cited

U.S. PATENT DOCUMENTS

| | | | |
|---|---|---|---|
| 8,732,043 B2* | 5/2014 | Shaikh | H04L 12/1407 705/32 |
| 8,982,893 B2* | 3/2015 | Akhtar | H04L 41/5054 370/401 |
| 9,001,682 B2* | 4/2015 | Kovvali | H04W 88/18 370/252 |
| 9,001,840 B2* | 4/2015 | Kovvali | H04W 28/0231 370/401 |
| 9,077,821 B2* | 7/2015 | Pallares Lopez | H04M 15/76 |
| 9,100,863 B2* | 8/2015 | Liu | H04W 12/033 |
| 9,191,265 B1* | 11/2015 | McGinn | H04L 12/1407 |
| 9,392,126 B2* | 7/2016 | Goldner | H04M 15/65 |
| 9,473,986 B2* | 10/2016 | Tomici | H04W 28/0268 |
| 9,722,929 B2* | 8/2017 | Miklos | H04L 5/006 |
| 10,033,881 B2* | 7/2018 | Chai | H04L 12/1407 |
| 10,201,024 B2* | 2/2019 | Jin | H04W 76/10 |
| 10,306,510 B2* | 5/2019 | Bolle | H04L 12/1407 |
| 2014/0177840 A1 | 6/2014 | Liu | |
| 2016/0262073 A1* | 9/2016 | Muley | H04W 36/22 |
| 2017/0325120 A1* | 11/2017 | Szilagyi | H04L 41/5067 |
| 2019/0289136 A1* | 9/2019 | Gan | H04M 15/57 |

* cited by examiner

PROXY EQUIPMENT IN A CELLULAR TELECOMMUNICATION SYSTEM

CROSS-REFERENCES TO RELATED APPLICATIONS

This application claims the benefit of the International Application No. PCT/EP2017/078994, filed on Nov. 13, 2017, and of the French patent application No. 1660995 filed on Nov. 14, 2016, the entire disclosures of which are incorporated herein by way of reference.

FIELD OF THE INVENTION

The present invention relates to bandwidth management in a cellular telecommunication system in which at least one base station is remotely linked by means of a wireless connection constituting a bottleneck in said cellular telecommunication system.

BACKGROUND OF THE INVENTION

Unlike the circuit switching model used by previous cellular communication systems, the LTE "Long Term Evolution" technology, also referred to as 4G (4th Generation), relies solely on a packet switching model. Future telecommunication technologies, such as the LTE-B technology, also referred to as 5G (5th Generation), should follow the same approach.

LTE technology aims to provide connectivity, based on the IP protocol (Internet Protocol), between the user equipment UE and a packet data network PDN. Although the LTE terminology encompasses a development of the UNTS (Universal Mobile Telecommunication System) radio access technology called E-UTRAN (Evolved Universal Terrestrial Radio Access Network), LTE technology is also accompanied by a development of the non-radio aspects, called SAE (System Architecture Evolution), which comprises, in particular, a core network part called EPC (Evolved Packet Core), which is a development of the core network introduced into the GPRS (General Packet Radio Service) technology. Together the LTE and SAE technologies form a cellular telecommunication system called EPS (Evolved Packet System).

In this context, the EPS cellular telecommunication system uses a concept of radio bearers, referred to as EPS bearers, for routing the IP traffic between a gateway in the PDN network and any item of user equipment UE. An EPS bearer is a set of coordinated resources dedicated to the transport of a stream of IP packets with a predetermined quality of service QoS between the gateway and the user equipment UE. Together, the E-UTRAN radio access part and the EPC core network part set up and release radio bearers according to application requirements vis-à-vis the user equipment UE present in the EPS cellular telecommunication system.

Multiple radio bearers can be set up, and activated simultaneously, for the same item of user equipment UE, in order to make available a plurality of data streams with different qualities of service QoS or to make it possible to provide connectivity to different PDN networks. For example, one item of user equipment UE may be engaged in a conversation of the VoIP (Voice over IP) type and simultaneously carry out web browsing or downloading in accordance with the FTP (File Transfer Protocol), in which case a first radio bearer provides the quality of service QoS required for the VoIP conversation and a second "best-effort" radio bearer provides a medium suited to web browsing or to downloading according to the FTP protocol.

Such an EPS cellular telecommunication system is shown schematically in FIG. 1. The EPS cellular telecommunication system therefore comprises an E-UTRAN radio access part 110 via which at least one item of user equipment UE 100 accesses the services of the EPS cellular telecommunication system, and an EPC core network part 120 giving access to various PDN networks. The E-UTRAN radio access part 110 comprises a plurality of base stations, called "eNodeB", with which items of user equipment UE communicate by radio in order to access services offered by the EPS cellular telecommunication system. For reasons of simplification, FIG. 1 shows a single eNB base station 111 and a single item of user equipment UE 100 interconnected by the wireless connection 151. The user equipment UE 100 accesses the services of the EPS cellular telecommunication system by means of a wireless connection 151 with the eNB base station 111. The eNB base station 111 is connected to an SGW gateway ("Serving GateWay") 123 of the EPC core network part 120 by means of a connection 153 and to a mobility management entity MME 122 of the EPC core network part 120 by means of a connection 152. The EPS cellular telecommunication system typically comprises a plurality of such SGW gateways, a plurality of such eNB base stations being connected to each of these SGW gateways. The EPS cellular telecommunication system typically comprises a plurality of such mobility management entities MME, a plurality of SGW gateways being connected to each of these mobility management entities MME.

The EPC core network part 120 further comprises at least one PGW gateway (PDN gateway) 125 for accessing the various PDN networks, a local subscription server HSS (Home Subscriber Server) 121, and PCRF (policy control and charging rules function) equipment 124 implementing a policy control and charging rules function. The present document is concerned more particularly with the control of quality-of-service QoS policies of this PCRF equipment 124. The EPS cellular telecommunication system typically comprises a plurality of such PGW gateways, a plurality of such SGW gateways being connected to each of these PGW gateways and a plurality of such PGW gateways being connected to each of these SGW gateways.

The PCRF equipment 124 is responsible for taking policy control decisions on quality of service QoS, as well as controlling charging functionalities implemented in a PCEF (policy control enforcement function) component of each PGW gateway. The policy control decisions on quality of service QoS are thus applied by the PCEF component of each PGW gateway concerned.

The MME entity 122 is equipment responsible for the control plan, and more particularly signaling operations, between the EPC core network part 120 of the EPS cellular telecommunication system and the user equipment UE connected to the SGW gateways for which the MME entity 122 is responsible.

The HSS server 121 is equipment managing a database in which information is stored relating to a profile of each user that has taken out a subscription to the services of the EPS cellular telecommunication system, as well as information relating to said subscription. The HSS server 121, in particular, stores, for each user, information about the PDN networks which said user is authorized to access by means of his user equipment UE. The HSS server 121 also stores in particular dynamic information representing the MME entity to which said user equipment UE is currently attached. The HSS server 121 may also include an authentication center AUC ("AUthentication Centre") responsible for generating authentication and security key vectors.

The PGW gateway 125 is, in particular, responsible for allocating IP addresses to the user equipment UE authorized to access the PDN network or networks to which the PGW gateway 125 gives access. The PGW gateway 125 is also, in particular, responsible for applying quality-of-service QoS policies vis-à-vis guaranteed bit rate (GBR) radio bearers and to enable an on-line charging system OCS to collect charging data by data stream, according to rules provided by the PCRF equipment 124.

The SGW gateway 123 is responsible for routing the data streams coming from and going to user equipment UE connected to the eNB base stations under the responsibility of the SGW gateway 123. The SGW gateway 123 serves, in particular, as a local mobility anchor when the user equipment UE 100 migrates from the eNB base station 111 to another eNB base station under the responsibility of the SGW gateway 123, and vice versa.

On the diagram in FIG. 1, the SGW gateway 123 is connected to the PGW gateway 125 by means of a connection 156. The SGW gateway 123 is connected to the MME entity 122 by means of a connection 155. The MME entity 122 is connected to the HSS server 121 by means of a connection 154. The PGW gateway 125 is connected to the PCRF equipment 124 by means of a connection 158. The PCRF equipment 124 is connected to the HSS server 121 by means of a connection 159. Furthermore, the PCRF equipment 124 is connected via a connection 157 to an item of AF (Application Function) equipment 130, also referred to as IMS (IP Multimedia Subsystem), which is situated outside the scope of the EPC core network part 120, implementing an application function.

In the context of LTE technology, the interfaces (and the message formats applicable)—also referred to as reference points according to LTE technology—between the various elements constituting the EPS cellular telecommunication system are standardized. In particular:

- the interface between the PGW gateway 125 and the PCRF equipment 124 is called Gx and is defined in the 3GPP specification TS 23.203: "Policy and Charging Control Architecture" and 3GPP TS 29.212 "Policy and Charging Control (PCC); Reference Points"; and
- the interface between the PCRF equipment 124 and the AF equipment 130 is called Rx and is defined in the 3GPP specification TS 23.203: "Policy and Charging Control Architecture" and 3GPP TS 29.214 "Policy and Charging Control over Rx Reference Point"

It should be noted that the Gx and Rx interfaces are based on the Diameter protocol, as specified in the normative document RFC 3588, which was defined to replace the RADIUS protocol ("Remote Authentication Dial-In User Service") as specified in the normative documents RFC 2865 and RFC 2866, in infrastructures of the AAA type ("Authentication, Authorization, Accounting/Auditing").

It should also be noted that the connections between the E-UTRAN radio access part 110 and the EPC core network part 120, as well as the connections within the EPC core network part 120, and the connections between the EPC core network part 120 and the AF equipment 130, are logic connections. This means that network equipment, such as routers or switches, is typically present on these connections to provide the transmissions of IP packets in which any message exchanged is encapsulated.

One example of message exchanges within the EPS cellular telecommunication system for effecting a set-up of a default radio bearer, initiated by the user equipment UE 100, is illustrated schematically in FIG. 2A. It should be noted, in fact, that the radio bearers set up in the EPS cellular telecommunication system are one of the following two types: default radio bearer, for which there is no guaranteed bit rate, and dedicated radio bearer, for which there is or is not a guaranteed bit rate.

In a step 201, the user equipment UE 100 initiates an attach procedure with the eNB base station 111. The eNB base station 111 contacts the MME entity 122, which decides to authorize, or not, the creation of the default radio bearer for the user equipment UE 100. The MME entity 122 obtains subscription information relating to the user equipment UE 100, selects the SGW gateway 123 as the local mobility anchor for the user equipment UE 100, and instructs the SGW gateway 123 to create internally the environment necessary for supporting the default radio bearer for the user equipment UE 100. The SGW gateway 123 then transmits a session creation request message to the PGW gateway 125. This attach procedure and the transmission of the session creation request message to the PGW gateway 125 are shown schematically by a single arrow (201) in FIG. 2A for reasons of simplification. It should be noted that a session defines a communication context for the user equipment UE concerned vis-à-vis access to the PDN network or networks to which the PGW gateway 125 gives access and to which the subscription associated with the user equipment UE concerned authorizes access. Each session includes a default radio bearer and optionally one or more dedicated radio bearers.

In a following step 202, the PGW gateway 125 initiates, with the PCRF equipment 124, an IP-CAN (IP connectivity access network session establishment) session establishment procedure. The PGW gateway 125 initiates this procedure by sending a dedicated message over the connection 158, i.e., via the Gx interface. This message, referred to as a CCR (credit control request) message, contains, in particular, information representing quality-of-service QoS parameters required for said default radio bearer. It should be noted that the CCR messages are defined by the Diameter protocol, more particularly in the normative document RFC 4006.

When the PCRF equipment 124 receives the IP-CAN message initiating the session establishment procedure, the PCRF equipment 124 checks with the HSS server 121 that the subscription of the user of the user equipment UE 100 is in accordance with the IP-CAN session to be established. To do this, the PCRF equipment 124 sends a profile request message to the HSS server 121 in a step 203. The HSS server 121 identifies the user profile concerned in a step 204, and takes from it information on the subscription of the user of the user equipment UE 100. In a step 205, the PCRF equipment 124 in response receives, from the HSS server 121, the subscription information enabling it to carry out said check. If the subscription of the user of the user equipment UE 100 is in conformity with the IP-CAN session to be established, the PCRF equipment 124 confirms, in a step 206, the establishment of the IP-CAN session, by sending to the PGW gateway 125 an acknowledgement message, called a CCA (credit control answer) message, over the connection 158, i.e., via the Gx interface. It should be noted that the CCA messages are defined by the Diameter protocol, more particularly in the normative document RFC 4006.

In a step 207, the PGW gateway 125 sets up the resources necessary for the establishment of an IP-CAN session for the user equipment UE in question. In other words, the PGW gateway 125, through its PCEF component, implements QoS policy enforcement operations, matching the requirements of the default radio bearer concerned.

The acknowledgement is next propagated through messages from the PGW gateway 125 to the user equipment UE 100, passing through the SGW gateway 123, the MME entity 122 and the eNB base station 111. This set of operations constitutes an acknowledgement procedure shown schematically by a single arrow (207) in FIG. 2A for reasons of simplification.

Next, in a step 208, signaling is set up between the PGW gateway 125 and the user equipment UE 100. Then, in an optional step 209, the PGW gateway 125 transmits an acknowledgement message to the PCRF equipment 124 in order to indicate to it that the setting up of the default radio bearer in question has ended.

It should also be noted that the core network part EPC can be configured according to a first mode, referred to as "simple" mode, or according to a second mode, referred to as "piggy-back" mode. In "simple" mode, the radio bearers are allocated, on demand, one after the other as described above. In "piggy-back" mode, the creation of a default radio bearer is accompanied by the sending, by the PCRF equipment 124 to the PGW gateway 125, of all the policies provided for the user (and therefore the user equipment UE) concerned. These policies describe all the radio bearers, and the quality-of-service QoS information that is applicable thereto, authorized by the user in question. The PGW gateway 125 then establishes the resources necessary for supporting all the radio bearers provided for the user (and therefore the user equipment UE) concerned.

It should also be noted that a setting up of a default radio bearer may also be initiated by the AF equipment 130. A corresponding example of message exchanges is illustrated schematically in FIG. 2B.

In a step 251, the AF equipment 130 initiates, with the PCRF equipment 124, a procedure establishing an IP-CAN session. The AF equipment 130 initiates this procedure by sending a message, called an AAR (authentication authorization request) message, over the connection 157, i.e., via the Rx interface. It should be noted that the AAR messages are defined by the Diameter protocol, more particularly, in the normative document RFC 4005. On reception of this message, in a step 252, the PCRF equipment 124 creates accordingly an IP-CAN session, after checking a match between session characteristic information provided by the AF equipment 130 in said message and the policies provided for the user (and therefore the user equipment UE) concerned.

In a step 253, the PCRF equipment 124 sends to the AF equipment 130 an acknowledgement message, called an AAA (authentication authorization answer) message, over the connection 157, i.e., via the Rx interface. It should be noted that the AAA messages are defined by the Diameter protocol, more particularly, in the normative document RFC 4005. The PCRF equipment 124 thus confirms that the IP-CAN session establishment request made by the AF equipment 130 has been taken into account.

In a step 254, the PCRF equipment 124 initiates an IP-CAN session establishment procedure, concerning the default radio bearer to be set up, with the PGW gateway 125. This procedure is initiated by sending a message, called an RAR (re-authentication request) message, over the connection 158, i.e., via the Gx interface. It should be noted that the RAR messages are defined by the Diameter protocol, more particularly, in the normative document RFC 4005.

In a step 255, the PGW gateway 125 sets up the resources necessary for the IP-CAN session establishment for the user equipment UE in question. In other words, the PGW gateway 125 implements, through its PCEF component, quality-of-service policy application operations (QoS policy enforcement), matching the requirements of the default radio bearer concerned.

In a step 256, the PGW gateway 125 sends to the PCRF equipment 124 an acknowledgement message, called an RAA (re-authentication answer) message, over the connection 158, i.e., via the Gx interface. It should be noted that the RAA messages are defined by the Diameter protocol, more particularly, in the normative document RFC 4006.

In a step 257, the PGW gateway 125 instructs the setting up of the session, and therefore of the default bearer in question, by messages from the PGW gateway 125 to the user equipment UE 100, passing through the SGW gateway 123, the MME entity 122 and the eNB base station 111. This set of operations is shown schematically by a single arrow (257) in FIG. 2B for reasons of simplification.

Next, in a step 258, signaling is established between the PGW gateway 125 and the user equipment UE 100. Then, in an optional step 259, the PGW gateway 125 transmits an acknowledgement message to the PCRF equipment 124 in order to indicate to it that the setting up of the default radio bearer in question has ended.

It should be noted that a setting up of one or more dedicated radio bearers can also be initiated in the context of the session creation as described above, either by the AF equipment 130 or by the user equipment UE 100.

The common point between these various procedures for establishing radio bearers and thus making it possible to activate data pathways in the EPS cellular telecommunication system is that the PCRF equipment 124 is systematically acted on and that consequently message exchanges occur over the connection 158, and optionally over the connection 157 when the AF equipment 130 is involved.

It may, in particular, be noted that these various procedures for setting up radio bearers in the EPS cellular telecommunication system is that the PCRF equipment 124 relies on the assumption that the connection 153 that connects the eNB base station 111 and the SGW gateway 123 does not have a bottleneck vis-à-vis the quality of service QoS of the radio bearers to be set up.

However, it is desirable to provide flexibility in the deployment of the eNB base stations by installing a wireless connection, such as a satellite connection, between said eNB base stations and the EPC core network part 120. This is particularly the case when it is wished to temporarily install an eNB base station in an operation site out of range of the existing eNB base stations, to enable operational teams, e.g., repair workers, to communicate via the EPS telecommunication system on the operation site. One difficulty does, however, present itself in such a context. This is because this wireless connection may constitute an unexpected bottleneck in the currently defined message exchanges for setting up radio bearers in the EPC cellular telecommunication system. In addition, the actual capacities of this wireless connection may change over time, depending, in particular, on the climatic conditions of the environment in which said wireless connection is established. This is the case, in particular, with high bit rate satellite connections, which are greatly disturbed by rain and fog, and for which a signal transmission rate and modulation adaptation must be made in order to ensure the connection, according to a signal attenuation, which may cause a reduction in bandwidth.

It is desirable to overcome these various drawbacks of the prior art. It is thus desirable to provide a solution that makes it possible to take into account, vis-à-vis the quality of service QoS in such an EPS cellular telecommunication system, the fact that one or more eNB base stations are remotely linked from the EPC core network part by means of one or more respective wireless connections. It is furthermore desirable that this solution should rely on the existing message exchange architecture and protocols, i.e., which do not require any structural and behavioral modification of the PCRF equipment, nor of any PGW gateway, nor of any SGW gateway, nor of the MME entity.

SUMMARY OF THE INVENTION

The invention relates to a method for managing bandwidth in a cellular telecommunication system comprising: a radio access part comprising a plurality of base stations enabling user equipment to access services of the cellular telecommunication system for which radio bearers must be set up; and a core network part comprising quality-of-service policy control equipment connected via a first connection to a gateway via which said radio bearers are set up in order to access said services of the cellular telecommunication system. The method is such that, at least one base station being remotely linked by wireless connection, proxy equipment included in the cellular telecommunication system performs the following steps: intercepting on said first connection each session establishment or session update message transmitted between the quality-of-service policy control equipment and the gateway; when said message does not concern a radio bearer involving a base station remotely linked by a wireless connection, propagating said message to its initially targeted destination and, when said message concerns at least one radio bearer involving a base station remotely linked by wireless connection: determining a remaining bandwidth via said wireless connection; when the remaining bandwidth determined covers a bandwidth requirement expressed in said message, propagating said message to its initially targeted destination; and, when the remaining bandwidth determined does not cover the bandwidth requirement, refusing, in place of the original destination of said message, the session establishment or update when the bandwidth determined does not cover a minimum bandwidth to be guaranteed expressed in said message, and otherwise modifying said message, before propagating it to its initially targeted destination, indicating a bandwidth requirement no more than the remaining bandwidth. Thus it is taken into account, vis-à-vis the quality of service QoS, that one or more base stations are remotely linked from the core network part by means of one or more respective wireless connections. In addition, the arrangement of the proxy equipment in the cellular telecommunication system is compatible with existing message exchange architecture and protocols, so that the proxy equipment acts transparently in the cellular telecommunication system.

According to a particular embodiment, the proxy equipment intercepts any message passing over the first connection: replacing, with the gateway, the address of the quality-of-service policy control equipment with the address of the proxy equipment; replacing, with the quality-of-service policy control equipment, the address of the gateway with the address of the proxy equipment; and, when the proxy equipment propagates any message intercepted on the first connection, the proxy equipment replaces the source address of said message with its own address and the destination address of said message with the address of its initially targeted destination. Thus the proxy equipment can easily act transparently vis-à-vis the quality-of-service policy control equipment and the gateway.

According to a particular embodiment, the cellular telecommunication system further comprising equipment with an application function connected by a second connection to the quality-of-service policy control equipment, the proxy equipment performs the following steps: intercepting on said second connection each session establishment or session update message transmitted from the equipment with an application function to the quality-of-service policy control equipment; when said message does not concern a radio bearer involving a base station remotely linked by a wireless connection, propagating said message to its initially targeted destination and, when said message concerns at least one radio bearer involving a base station remotely linked by a wireless connection: determining a remaining bandwidth via said wireless connection; when the remaining bandwidth determined covers a bandwidth requirement expressed in said message, propagating said message to its initially targeted destination; and, when the remaining bandwidth determined does not cover the bandwidth requirement, refusing, in place of the original destination of said message, the session establishment or update. Thus, unnecessary exchanges (in the light of the actual capacities of said wireless connection, between the quality-of-service policy control equipment and the gateway are avoided, always transparently in the cellular telecommunication system.

According to a particular embodiment, the proxy equipment intercepts any message passing over the second connection: replacing, with the equipment with an application function, the address of the quality-of-service policy control equipment with the address of the proxy equipment; replacing, with the quality-of-service policy control equipment, the address of the equipment with an application function with the address of the proxy equipment; and, when the proxy equipment propagates any message intercepted on the second connection, the proxy equipment replaces the source address of said message with its own address and the destination address of said message with the address of its initially targeted destination. Thus, the proxy equipment can easily act transparently vis-à-vis the equipment with an application function, and always transparently for the quality-of-service policy control equipment.

According to a particular embodiment, before rejecting a session establishment or update, the proxy equipment seeks to degrade or close one or more radio bearers passing via said wireless connection, by emulating a sending, by the equipment with an application function, respectively a session update message or a session closure message intended for the quality-of-service policy control equipment. Thus, the proxy equipment can easily close sessions of less importance from an operational point of view, always transparently for the rest of the cellular telecommunication system.

According to a particular embodiment, said wireless connection being established between a first transceiver device and a second transceiver device, the proxy equipment determines the remaining bandwidth via said wireless connection by performing the following steps: interrogating the first transceiver device and/or the second transceiver device in order to obtain actual bandwidth information on said wireless connection; determining a bandwidth used via said wireless connection according to radio bearers previously set up via said wireless connection; and deducing the remaining bandwidth from the actual bandwidth of said wireless connection and the bandwidth used via said wireless connection. Thus, the proxy equipment can easily determine the remaining bandwidth via said wireless connection.

According to a particular embodiment, before rejecting a session establishment or update, the proxy equipment seeks to degrade or close one or more radio bearers passing via said wireless connection, by emulating a sending, by the quality-of-service policy control equipment, respectively of a session update message or of a session closure message intended for the gateway. Thus, the proxy equipment can also easily close sessions of less importance from an operational point of view, always transparently for the rest of the cellular telecommunication system.

According to a particular embodiment, the cellular telecommunication system further comprising an on-line charging system connected to said gateway via a third connection, before rejecting a session establishment or update, the proxy equipment seeks to close one or more radio bearers passing via said wireless connection, by emulating a sending, by the on-line charging system, of a session closure message for lack of credit intended for the gateway. Thus, the proxy equipment can also easily close sessions of less importance from an operational point of view, always transparently for the rest of the cellular telecommunication system.

According to a particular embodiment, the cellular telecommunication system further comprising an off-line charging system connected to said gateway via a fourth connection, before rejecting a session establishment or update, the proxy equipment seeks to close one or more radio bearers passing via said wireless connection, by emulating a sending, by the off-line invoicing system, of a session closure message for lack of credit intended for the gateway. Thus, the proxy equipment can also easily close sessions of less importance from an operational point of view, always transparently for the rest of the cellular telecommunication system.

According to a particular embodiment, when the proxy equipment modifies a session establishment message or a session update message, the proxy equipment keeps a margin of bandwidth with respect to the remaining bandwidth, and the proxy equipment seeks to degrade and/or to close one or more radio bearers when the proxy equipment detects a drop in remaining bandwidth on said wireless connection below a first predefined threshold lower than said margin. Thus, the cellular telecommunication system adapts to degradations in transmission conditions via said wireless connection.

According to a particular embodiment, when the proxy equipment modifies a session establishment message or a session update message, the proxy equipment keeps a margin of bandwidth with respect to the remaining bandwidth, and the proxy equipment seeks to degrade and/or to close one or more radio bearers when the proxy equipment detects a drop in remaining bandwidth that follows a slope leading, within a predefined period of time, to a remaining bandwidth estimated to be below a first predefined threshold lower than said margin. Thus, the cellular telecommunication system anticipates degradations in transmission conditions via said wireless connection.

According to a particular embodiment, the proxy equipment seeks to improve and/or to restore one or more radio bearers previously degraded by the proxy equipment, when the proxy equipment detects an increase in remaining bandwidth on the wireless connection above a second predefined threshold higher than said margin. Thus, the cellular telecommunication system adapts to improvements in transmission conditions via said wireless connection.

According to a particular embodiment, the cellular telecommunication system is of the LTE type and said wireless connection is a satellite connection.

The invention also relates to proxy equipment intended to be integrated in a cellular telecommunication system comprising: a radio access part comprising a plurality of base stations enabling user equipment to access services of the cellular telecommunication system for which radio bearers must be set up; and a core network part comprising quality-of-service policy control equipment connected via a first connection to a gateway via which said radio bearers are set up in order to access said services of the cellular telecommunication system. The proxy equipment is such that, at least one base station being remotely linked by wireless connection, the proxy equipment includes: means for intercepting, on said first connection, each session establishment or session update message transmitted between the quality-of-service policy control equipment and the gateway; when said message does not concern a radio bearer involving a base station remotely linked by a wireless connection, means for propagating said message to its initially targeted destination and, when said message concerns at least one radio bearer involving a base station remotely linked by a wireless connection: means for determining a remaining bandwidth via said wireless connection; when the remaining bandwidth determined covers a bandwidth requirement expressed in said message, means for propagating said message to its initially targeted destination; and, when the remaining bandwidth determined does not cover the bandwidth requirement, means for refusing, in place of the original destination of said message, the establishment or updating of a session when the bandwidth determined does not cover a minimum bandwidth to be guaranteed expressed in said message, and otherwise means for modifying said message, before propagating it to its initially targeted destination, indicating a bandwidth requirement of no more than the remaining bandwidth.

The invention also relates to a cellular telecommunication system comprising: a radio access part comprising a plurality of base stations enabling user equipment to access services of the cellular telecommunication system for which radio bearers must be set up; and a core network part comprising quality-of-service policy control equipment connected via a first connection to a gateway via which said radio bearers are set up in order to access said services of the cellular telecommunication system. Said cellular telecommunication system is such that, at least one base station being remotely linked by wireless connection, said system includes the proxy equipment as mentioned above.

The invention also relates to a computer program that can be stored on a medium and/or downloaded from a communication network in order to be read by a processor. This computer program comprises instructions for implementing the method mentioned above in any of the embodiments thereof when said program is executed by said processor. The invention also relates to storage means on which such a computer program is stored.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE PREFERRED EMBODIMENTS

To achieve the aforementioned objectives, it is proposed to integrate proxy equipment in the EPS cellular telecommunication system in question. This proxy equipment intercepts messages exchanged between the PCRF equipment 124 and the PGW gateway 125 so as to detect establishments of sessions or updates of sessions that would be incompatible with the actual capabilities of any wireless connection used for linking a base station involved in these sessions (and therefore in the radio bearers that make them up). In the event of total incompatibility, the proxy equipment rejects the session establishment or the session update in place of the destination initially targeted by the intercepted message. In the event of partial incompatibility, the proxy equipment modifies the intercepted message in order to make it compatible with the actual capabilities of said wireless connection, and propagates it to the destination initially targeted by the intercepted message. Before rejecting a session establishment or update, the proxy equipment may decide to degrade or even to close one or more radio bearers previously set up via said wireless connection, e.g., radio bearers that would have a lower priority level associated. The proxy equipment may also decide to degrade or even to close one or more radio bearers previously set up when the actual capabilities of said wireless connection drop because of variations in unfavorable climatic conditions. The proxy equipment may then also decide to improve or restore one or more radio bearers previously degraded when the actual capabilities of said wireless connection increase because of variations in favorable climatic conditions.

Figure 3:
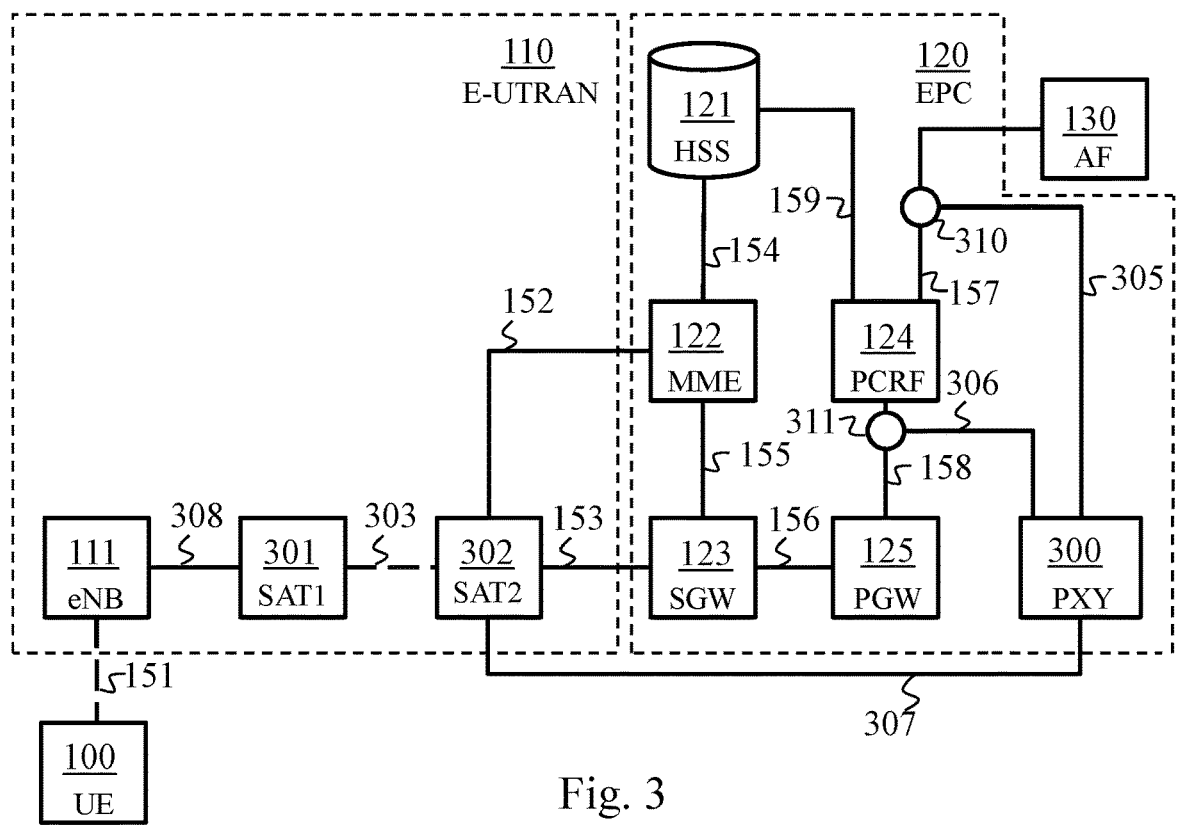
FIG. 3 illustrates schematically a cellular telecommunication system according to an embodiment of the present invention.

FIG. 3 illustrates schematically an EPS cellular telecommunication system according to an embodiment of the present invention. In FIG. 3 there are various elements already present in relation to FIG. 1, namely the user equipment UE 100, the eNB base station 111, the SGW gateway 123, the HSS server 121, the MME entity 122, the PGW gateway 125, the PCRF equipment 124 and the AF equipment 130. At the EPC core network part 120, these elements are interconnected as already presented in relation to FIG. 1.

Figure 1:
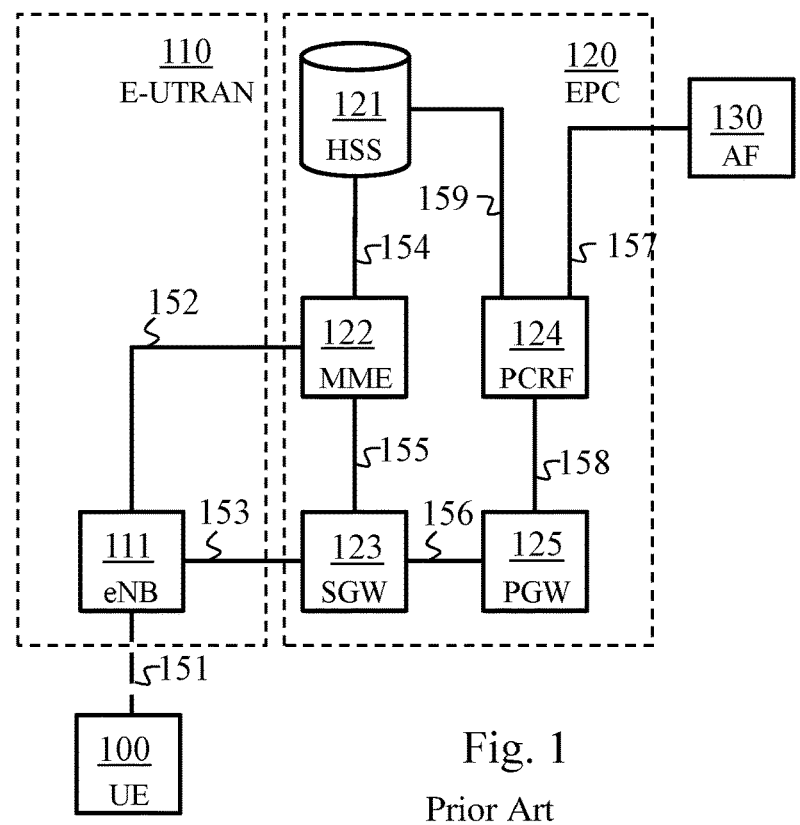
FIG. 1 illustrates schematically a cellular telecommunication system according to the prior art.
Figure 2A:
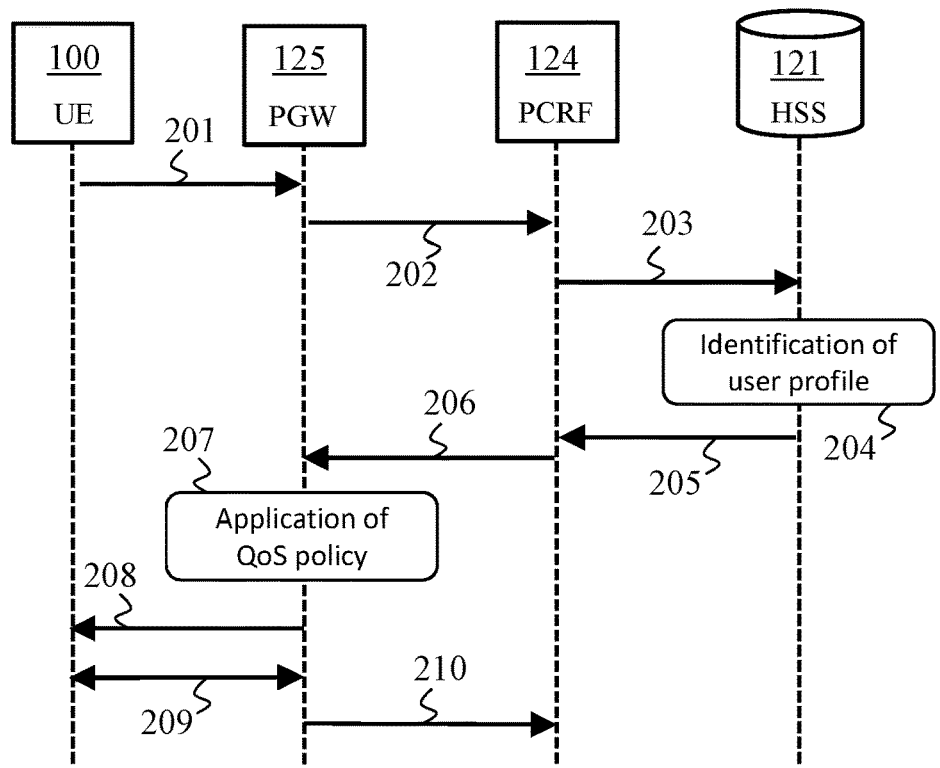
FIG. 2A illustrates schematically first exchanges occurring in the cellular telecommunication system in FIG. 1 according to the prior art.
Figure 2B:
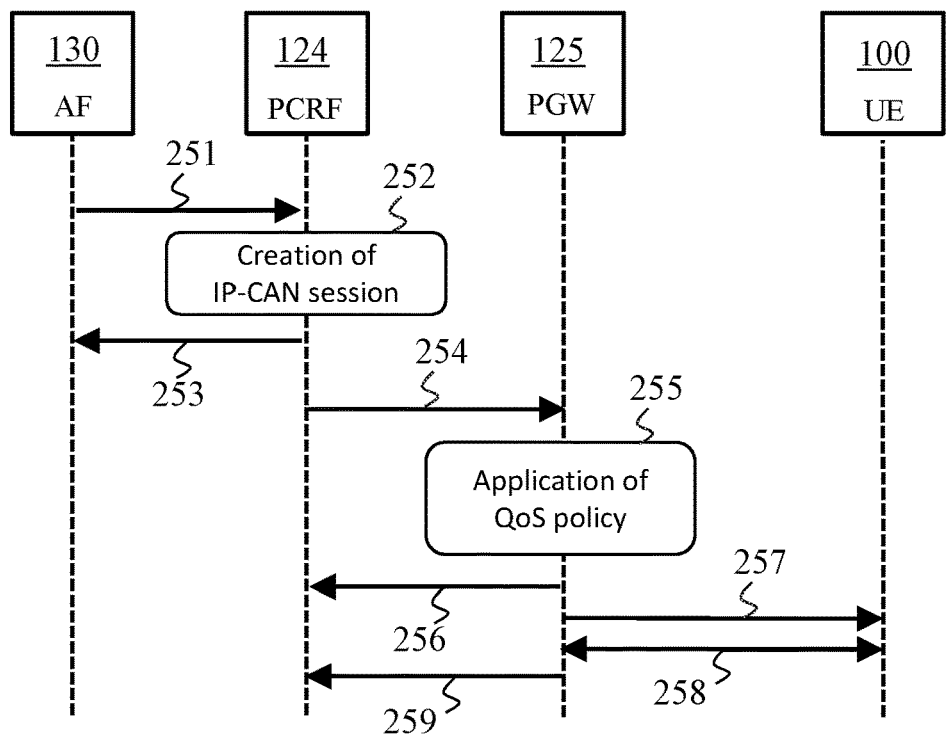
FIG. 2B illustrates schematically second exchanges occurring in the cellular telecommunication system in FIG. 1 according to the prior art.

Compared with the scheme in FIG. 1, the E-UTRAN radio access part 110 is modified in order to show a wireless connection 303 for facilitating the deployment of the eNB base station 111. This wireless connection 303 is implemented by means of a pair of transceiver devices SAT1 301 and SAT2 302. The wireless connection 303 is preferentially a satellite connection. The transceiver device SAT1 301 is connected to the eNB base station 111 by a connection 308 with a bandwidth at least equal to the maximum bandwidth that the wireless connection 303 can offer. In other words, the connection 308 is not seen as a bottleneck with respect to the actual capacity of the wireless connection 303. The transceiver device SAT2 302 is connected to the MME entity 122 by the connection 152, as well as to the SGW gateway 123 by the connection 153. The base station eNB 111 is therefore thus able to exchange messages and data with the SGW gateway 123 and with the MME entity 122, the inclusion of the wireless connection 303 in the E-UTRAN radio access part 111 being transparent vis-à-vis the eNB base station 111, the SGW gateway 123 and the MME entity 122.

Compared with the scheme in FIG. 1, the EPC core network part has been modified by adding proxy equipment PXY 300. The proxy equipment PXY 300 is connected, via a connection 305, to a first item of network equipment (e.g., router or switch) 310 present on the connection 157. The proxy equipment PXY 300 is also connected, via a connection 306, to a second item of network equipment (e.g., router or switch) 311 present on the connection 158. The proxy equipment PXY 300 is finally connected, via a connection 307, to the transceiver device SAT2 302. It should be noted that the proxy equipment PXY 300 may also be considered to be situated outside the scope of the EPC core network part 120.

The connection 307 enables the proxy equivalent PXY 300 to obtain, from the transceiver device SAT2 302, information representing actual capacities of the wireless connection 303. It should be noted that a variant embodiment consists of establishing the connection 307 between the proxy equipment PXY 300 and the transceiver device SAT1 301 so that the transceiver device SAT1 301 supplies to the proxy equipment PXY 300 said information representing the actual capacities of the wireless connection 303. The connection 307 may also connect the proxy equipment PXY 300 with the transceiver device SAT1 301 and with the transceiver device SAT2 302 (for example one of said transceiver devices being able to supply information representing the actual capacities of the wireless connection 303 in one communication direction, and the other one of said transceiver devices being able to supply information representing the actual capacities of the wireless connections 303 in the other communication direction).

As detailed hereinafter, the proxy equipment PXY 300 intercepts, and optionally modifies, in order to take into account the actual capacities of wireless connections used for remotely linking eNBs base stations, messages that pass over the connection 158, i.e., over the Gx interface in the context of LTE technology. In order to operate as in the context of FIG. 1, the EPS cellular telecommunication system is such that the PCRF equipment 124 is supposed to have knowledge of the IP address of the PGW gateway 125, and vice versa. In order to be able to intercept the messages on the connection 158, the EPS cellular telecommunication system is such that the IP address of the PGW gateway 125 is replaced by the IP address of the proxy equipment PXY 300 with the PCRF equipment 124, and the IP address of the PCRF equipment 124 is replaced by the IP address of the proxy equipment PXY 300 with the PGW gateway 125. The PCRF equipment 124 thus believes that it is exchanging messages with the PGW gateway 125 whereas, in fact, the PCRF equipment 124 is exchanging these messages with the proxy equipment PXY 300. Likewise, the PGW gateway 125 thus believes that it is exchanging messages with the PCRF equipment 124 whereas, in fact, the PGW gateway 125 is exchanging these messages with the proxy equipment PXY 300. Thus, when the proxy equipment PXY 300 returns an intercepted message intended for the PCRF equipment 124, the proxy equipment PXY 300 enters, as the destination IP address (which was then its own IP address), the IP address of the PCRF equipment 124 and enters, as the source IP address (which was the IP address of the PGW gateway 125), its own IP address. In addition, when the proxy equipment PXY 300 returns an intercepted message intended for the PGW gateway 125, the proxy equipment PXY 300 enters as the destination IP address (which was then its own IP address), the IP address of the PGW gateway 125 and enters, as the source IP address (which was the IP address of the PCRF equipment 124), its own IP address.

It should be noted that the presence of the second item of network equipment 311 on the connection 158 is not strictly necessary.

In a variant embodiment, the second item of network equipment 311 is configured to divert to the proxy equipment PXY 300 the messages passing over the connection 158, i.e., over the Gx interface in the context of LTE technology. For example, the second item of network equipment 311 has a dedicated connection with the proxy equipment PXY 300, for example in the form of a tunnel. The second item of network equipment 311 encapsulates and then transmits via this tunnel any incoming message. The second item of network equipment 311 de-encapsulates any message issuing from the tunnel and propagates it as if the message had not been diverted to the proxy equipment PXY 300. It is thus not necessary to deceive the PGW gateway 125 with regard to the IP address of the PCRF equipment 124, nor to deceive the PCRF equipment 124 with regard to the IP address of the PGW gateway 125.

In a particular embodiment detailed hereinafter, the proxy equipment PXY 300 also intercepts messages that pass over the connection 157, i.e., over the Rx interface in the context of LTE technology. In order to operate as in the context of FIG. 1, the EPS cellular telecommunication system is such that the PCRF equipment 124 is supposed to have knowledge of the IP address of the AF equipment 130, and vice versa. In order to be able to intercept the messages on the connection 157, the EPS cellular telecommunication system is such that the IP address of the AF equipment 130 is replaced by the IP address of the proxy equipment PXY 300 with the PCRF equipment 124, and the IP address of the PCRF equipment 124 is replaced by the IP address of the proxy equipment PXY 300 with the AF equipment 300. The PCRF equipment 124 thus believes that it is exchanging messages with the AF equipment 130, whereas, in fact, the PCRF equipment 124 is exchanging these messages with the proxy equipment PXY 300. Likewise, the AF equipment 130 thus believes that it is exchanging messages with the PCRF equipment 124 whereas, in fact, the AF equipment 130 is exchanging these messages with the proxy equipment PXY 300. Thus, when the proxy equipment PXY 300 sends an intercepted message to the PCRF equipment 124, the proxy equipment PXY 300 enters, as the destination IP address (which was then its own IP address), the IP address of the PCRF equipment 124 and enters, as the source IP address (which was the IP address of the AF equipment 130), its own IP address. In addition, when the proxy equipment PXY 300 sends an intercepted message intended for the AF equipment 130, the proxy equipment PXY 300 enters, as the destination IP address (which was then its own IP address), the IP address of the AF equipment 130 and enters, as the source IP address (which was the IP address of the PCRF equipment 124, its own IP address.

It should be noted that the presence of the first item of network equipment 310 on the connection 157 is not strictly necessary.

In a variant embodiment, the first item of network equipment 310 is configured to divert to the proxy equipment PXY 300 the messages passing over the connection 157, i.e., over the Rx interface in the context of LTE technology, and the second item of network equipment 311 is configured to divert to the proxy equipment PXY 300 the messages passing over the connection 158, i.e., over the Gx interface in the context of LTE technology. For example, the first item of network equipment 310 and the second item of network equipment 311 each have a dedicated connection with the proxy equipment PXY 300, for example in the form of a tunnel. The first item of network equipment 310 and the second item of network equipment 311 encapsulate and then transmit via their respective tunnels any incoming message. The first item of network equipment 310 and the second item of network equipment 311 de-encapsulate any message issuing from their respective tunnels and propagate it as if the message had not been diverted to the proxy equipment PXY 300. It is thus not necessary to deceive the PGW gateway 125 about the IP address of the PCRF equipment 124, nor to deceive the PCRF equipment 124 about the IP address of the PGW gateway 125.

Thus, in a way that is transparent for the PCRF equipment 124, for the PGW gateway 125 and for the AF equipment 130, the proxy equipment PXY 300 intercepts messages that pass over the connection 158, i.e., over the Gx interface in the context of LTE technology, and if applicable intercepts messages that pass over the connection 157, i.e., over the Rx interface in the context of LTE technology. Given that the proxy equipment PXY 300 has knowledge of the actual capacities of the wireless connection 303 by means of the exchanges with the transceiver device SAT2 302 (or with the transceiver device SAT1 301) via the connection 307, the proxy equipment PXY 300 is in a position to be able to modify said messages, which are passing over the connection 158 and possibly over the connection 157, in order to take into account said actual capacities of the wireless connection 303. This aspect is detailed hereinafter in relation to FIGS. 5 and 6.

In a particular embodiment, the proxy equipment PXY 300 is co-located with or is connected to an orchestration device. One may be included in the other. The orchestration device implements a network virtualization function NVF. Such an orchestration device is, for example, in accordance with the ETSI specifications GS NFV-MAN 001 "Network Functions Virtualisation (NFV); Management and Orchestration". The orchestration device aims to simplify the process of procuring and controlling applications and services within the cellular telecommunication system EPS. The orchestration device is configured to continuously monitor the activity of the EPS cellular telecommunication system, and, more particularly, the establishments and closures of corresponding sessions and radio bearers, for each user whose subscription to the services of the EPS cellular telecommunication system is declared to the HSS server 121, as well as the location of the user equipment UE of said user in the EPS cellular telecommunication system (i.e., the eNB base station via which said user equipment UE accesses the services of the EPS cellular telecommunication system). The orchestration device is thus configured to inform the proxy equipment PXY 300 of corresponding sessions and radio bearers that have been set up, as well as the features thereof, in particular, the bandwidth that is respectively allocated to them and preferentially of a priority level that is respectively associated therewith. The orchestration device can construct this knowledge from information supplied by the proxy equipment PXY 300. This is because the proxy equipment PXY 300 intercepting the messages passing over the connection 158, i.e., over the Gx interface in the context of LTE technology, and, if applicable, the messages passing over the connection 157, i.e., over the Rx interface in the context of LTE technology, the proxy equipment PXY 300 can inform the orchestration device of the setting up of corresponding sessions and radio bearers, and their respective characteristics. The proxy equipment PXY 300 can in the same way inform the orchestration device of modifications made to said corresponding sessions and radio bearers, as well as the closures thereof. The orchestration device then maintains, on behalf of the proxy equipment PXY 300, a representation of the activity of the EPS cellular telecommunication system. The orchestration device is also configured to indicate to the proxy equipment PXY 300 which are the eNB base stations that are remotely linked by wireless connection. The orchestration device can construct this knowledge from information supplied by manual configuration. The orchestration device is further configured to indicate to the proxy equipment PXY 300 in which cell such and such user equipment UE is located. The orchestration device can construct this knowledge from information supplied by the proxy equipment PXY 300. This is because, since the proxy equipment PXY 300 intercepts the messages passing over the connection 158, i.e., over the Gx interface in the context of LTE technology, the proxy equipment PXY 300 can inform the orchestration device of the attachments and detachments of user equipment UE. It should be noted that the session update messages at the initiative of the user equipment UE passing over the connection 158 also provide location (cell) information on the user equipment UE.

Figure 4A:
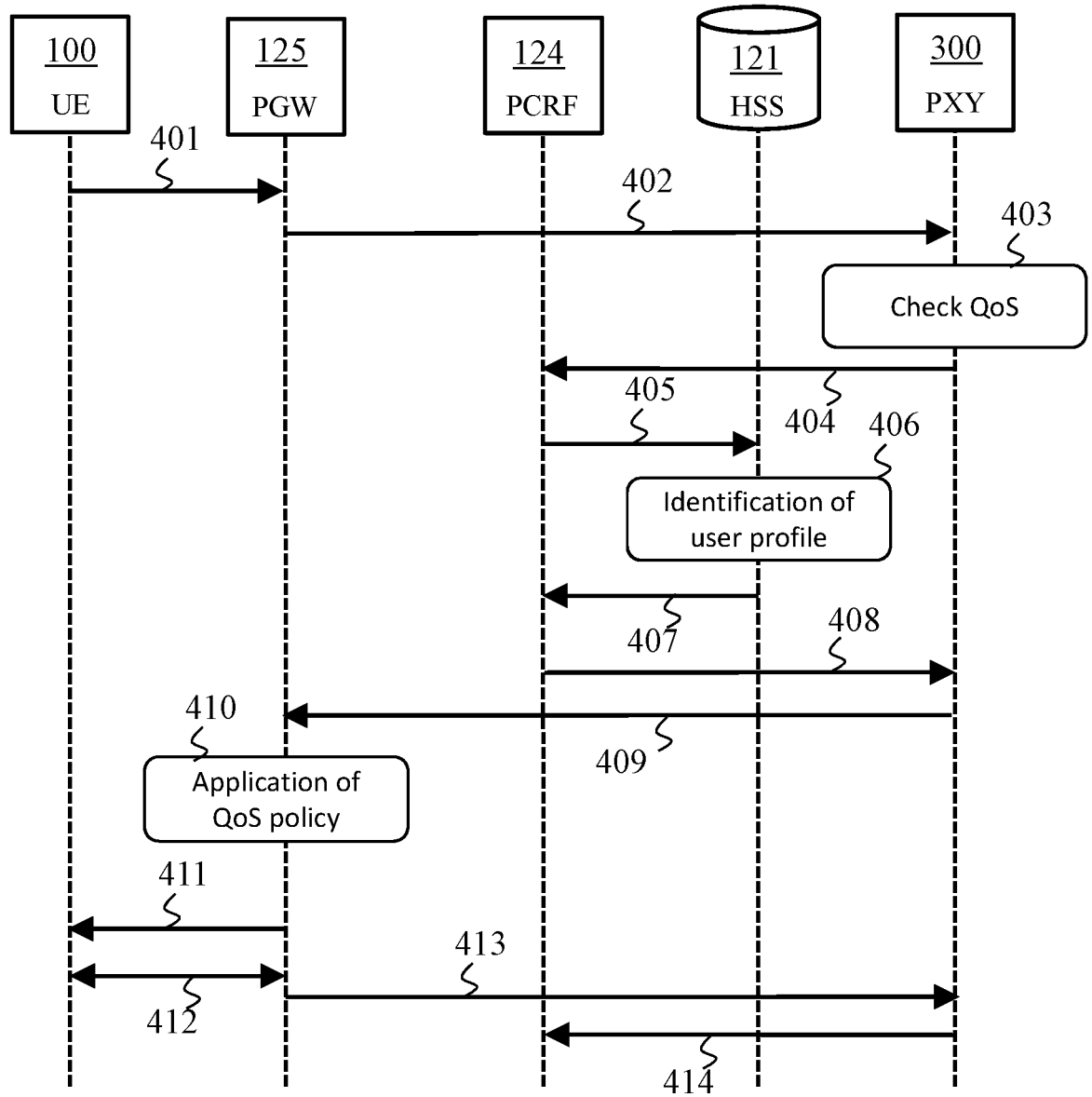
FIG. 4A illustrates schematically first exchanges occurring in the cellular telecommunication system in FIG. 3, according to an embodiment of the present invention.

An example of message exchanges in the EPS cellular telecommunication system for setting up a default radio bearer, initiated by the user equipment UE 100, is illustrated schematically in FIG. 4A.

In a step 401, the user equipment UE 100 initiates an attach procedure with the eNB base station 111. The eNB base station 111 contacts the MME entity 122, which decides to enable or not the creation of the default radio bearer for the user equipment UE 100. The MME entity 122 obtains subscription information relating to the user equipment UE 100, selects the SGW gateway 123 as a local mobility anchor for the user equipment UE 100, and instructs the SGW gateway 123 to create internally the environment necessary for supporting the default radio bearer for the user equipment UE 100. The SGW gateway 123 then transmits a session creation request message to the PGW gateway 125. This attach procedure and the transmission of the session creation request message to the PGW gateway 125 are shown schematically by a single arrow (401) in FIG. 4A for reasons of simplification.

In a following step 402, the PGW gateway 125 seeks to initiate, with the PCRF equipment 124, an IP-CAN session establishment procedure. The PGW gateway 125 initiates this procedure by sending a dedicated message over the connection 158. In the context of LTE technology, the PGW gateway 125 sends a CCR message via the Gx interface. This message contains in particular information representing quality-of-service QoS parameters required for said default radio bearer. Although intended for the PCRF equipment 124, this message is intercepted by the proxy equipment PXY 300.

In a step 403 (as detailed below in relation to FIG. 5), the proxy equipment PXY 300 analyses the information representing the quality-of-service QoS parameters required for said default radio bearer that are contained in said intercepted message, and compares it with the actual capacities of the wireless connection 303, taking account of the radio bearers already set up via said wireless connection 303. The proxy equipment PXY 300 then decides accordingly whether said default radio bearer can be set up, or not, in the light of the actual capacities of the wireless connection 303 and under what conditions said default radio bearer can be set up.

If the proxy equipment PXY 300 decides that said default radio bearer cannot be set up in the light of the actual capacities of the wireless connection 303, the proxy equipment PXY 300 rejects the IP-CAN session establishment procedure by responding to the PGW gateway 125 instead of the PCRF equipment 124. In the context of LTE technology, the proxy equipment PXY 300 rejects the IP-CAN session establishment procedure by sending to the PGW gateway 125 via the Gx interface a CCA message representing a negative response.

If the proxy equipment PXY 300 decides that said default radio bearer can be set up in the light of the actual capacities of the wireless connection 303, the proxy equipment PXY 300 optionally modifies the information representing the quality-of-service QoS parameters required for said default radio bearer that are contained in said intercepted message, in order to adjust them to the actual capacities of the wireless connection 303. Next, in a step 404, the proxy equipment PXY 300 sends the message, optionally modified in order to take into account the actual capacities of the wireless connection 303, to the PCRF equipment 124 via the connection 158.

When the PCRF equipment 124 receives the message initiating the IP-CAN session establishment procedure (optionally modified by the proxy equipment PXY 300 in order to take into account the actual capacities of the wireless connection 303), the PCRF equipment 124 checks with the HSS server 121 that the subscription of the user of the user equipment UE 100 is in accordance with the IP-CAN session to be established. To do this, the PCRF equipment 124 sends a profile request message to the HSS server 121 in a step 405. The HSS server 121 identifies the user profile concerned in a step 406, and takes therefrom information on the subscription of the user of the user equipment UE 100. In a step 407, the PCRF equipment 124 receives from the HSS server 121 subscription information enabling it to carry out said check. If the subscription of the user of the user equipment UE 100 is in accordance with the IP-CAN session to be established, the PCRF equipment 124 confirms, in a step 408, the establishment of the IP-CAN session, by sending to the PGW gateway 125 a dedicated acknowledgement message on the connection 158. In the context of LTE technology, the PCRF equipment 124 sends via the Gx interface a CCA message representing a positive response. Although intended for the PGW gateway 125, this acknowledgement message is intercepted by the proxy equipment PXY 300. The proxy equipment PXY 300 detects that the intercepted message is an acknowledgement message, which therefore follows a request message that had previously been intercepted and had already been processed by the proxy equipment PXY 300. The proxy equipment PXY 300 can then know whether the PCRF equipment 124 has or has not accepted establishment of the IP-CAN session. This is because, should the PCRF equipment 124 reject the establishment of the IP-CAN session, the PCRF equipment 124 sends a negative response message to the PGW gateway 125, which is also intercepted by the proxy equipment PXY 300. In this case, in the context of LTE technology, the PCRF equipment 124 sends via the Gx interface a CCA message representing a negative response.

In a step 409, the proxy equipment PXY 300 then sends said acknowledgement message to the PGW gateway 125 via the connection 158.

In a step 410, the PGW gateway 125 sets up the resources necessary for the establishment of the IP-CAN session for the user equipment UE in question. In other words, the PGW gateway 125 implements, by means of its PCEF component, quality-of-service policy application operations (QoS policy enforcement), matching the requirements of the default radio bearer concerned.

The acknowledgement is next propagated by messages from the gateway PGW 125 to the user equipment UE 100, passing through the SGW gateway 123, the MME entity 122 and the eNB base station 111. This set of operations constitutes an acknowledgement procedure shown schematically by a single arrow (411) in FIG. 1A for reasons of simplification.

Next, in a step 412, signaling is established between the PGW gateway 125 and the user equipment UE 100. Then, in an optional step 413, the PGW gateway 125 transmits an acknowledgement message to the PCRF equipment 124 via the connection 158, in order to indicate to it that the setting up of the default radio bearer in question has ended. In the context of LTE technology, this acknowledgement message is a CCR message transmitted via the Gx interface. Although intended for the PCRF equipment 124, this acknowledgement message is intercepted by the proxy equipment PXY 300. The proxy equipment PXY 300 detects that the intercepted message is an acknowledgement message, which therefore follows a request message that was previously intercepted and which has already been processed by the proxy equipment PXY 300. The proxy equipment PXY 300 can then know whether or not the setting up of the default radio bearer in question has correctly ended.

In a step 411, the proxy equipment PXY 300 then sends said acknowledgement message to the PCRF equipment 124 via the connection 158.

Figure 4B:
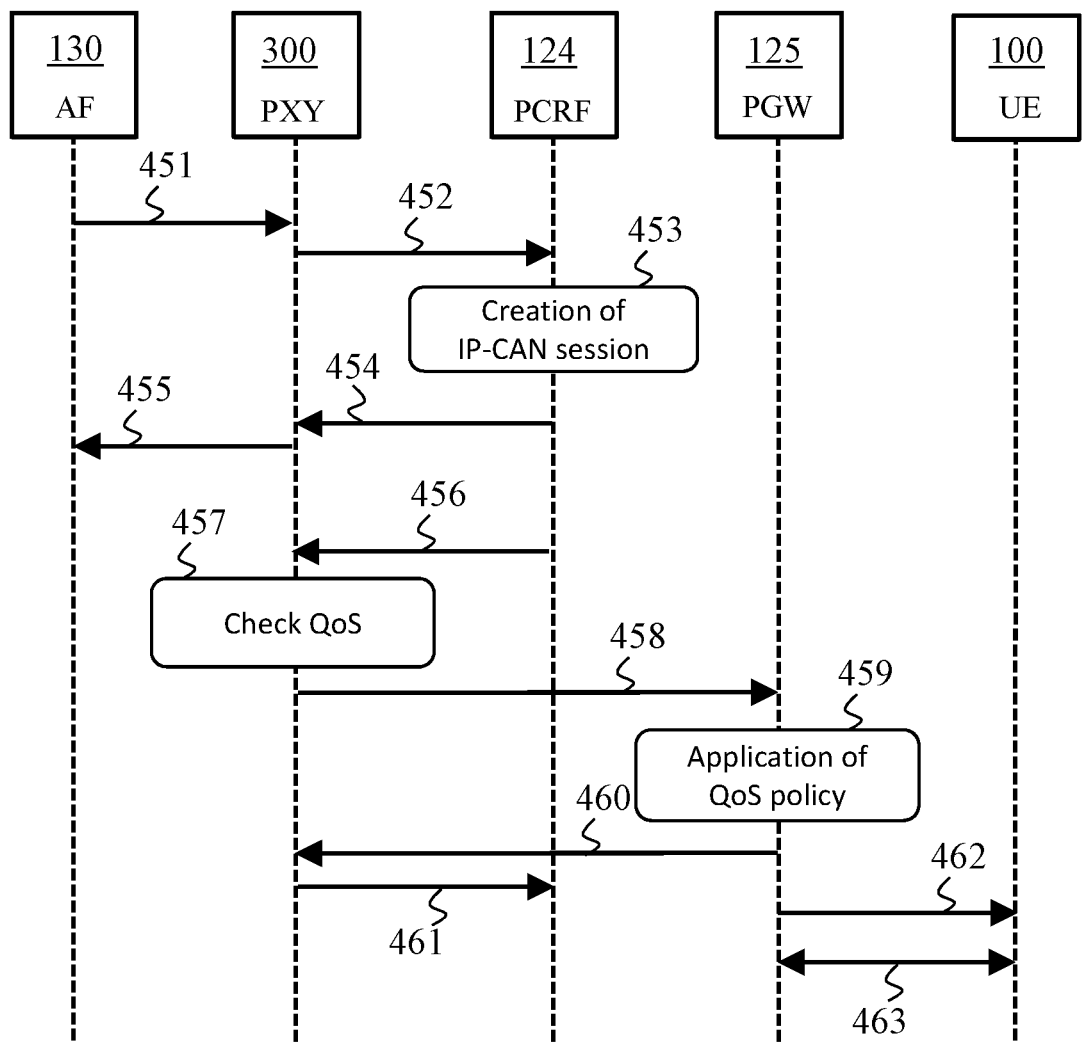
FIG. 4B illustrates schematically second exchanges occurring in the cellular telecommunication system in FIG. 3, according to an embodiment of the present invention.

It should also be noted that a setting up of a default radio bearer can also be initiated by the AF equipment 130. A corresponding example of message exchanges is illustrated schematically in FIG. 4B.

In a step 451, the AF equipment 130 initiates, with the PCRF equipment 124, an IP-CAN session establishment procedure. The AF equipment 130 initiates this procedure by sending a dedicated message over the connection 157. In the context of LTE technology, this message is an AAR message transmitted via the Rx interface. This message is, in a particular embodiment detailed hereinafter in relation to FIG. 6, intercepted by the proxy equipment PXY 300. The proxy equipment PXY 300 analyses the information representing the quality-of-service QoS parameters required for said default radio bearer that are contained in said intercepted message, and compares them with the actual capacities of the wireless connection 303, taking account of the radio bearers already set up via said wireless connection 303. The proxy equipment PXY 300 then decides accordingly whether said default radio bearer can or cannot be set up in the light of the actual capacities of the wireless connection 303 and under what conditions.

If the proxy equipment PXY 300 decides that said default radio bearer cannot be set up in the light of the actual capacities of the wireless connection 303, the proxy equipment PXY 300 rejects the IP-CAN session establishment procedure by responding to the AF equipment 130 in place of the PCRF equipment 124. In other words, the proxy equipment PXY 300 rejects the IP-CAN session establishment procedure by sending a negative response to the AF equipment 130. In the context of LTE technology, this message is an AAA message representing a negative response and is transmitted via the Rx interface.

If the proxy equipment PXY 300 decides that said default radio bearer can be set up in the light of the actual capacities of the wireless connection 303, the proxy equipment PXY 300 sends the intercepted message to the PCRF equipment 124 via the connection 157, in a step 452.

On reception of this message, in a step 453, the PCRF equipment 124 creates accordingly an IP-CAN session, after a check on the match between session characteristic information supplied by the AF equipment 130 in said message and the policies provided for the user (and therefore the user equipment UE) concerned.

In a step 454, the PCRF equipment 124 sends an acknowledgement message to the AF equipment 130 over the connection 157. In the context of LTE technology, the PCRF equipment 124 sends an AAA message via the Rx interface. The PCRF equipment 124 thus confirms that the IP-CAN session establishment request made by the AF equipment 130 has been taken into account. This message is, in the particular embodiment detailed below in relation to FIG. 6, intercepted by the proxy equipment PXY 300. The proxy equipment PXY 300 detects that the intercepted message is an acknowledgement message, which therefore follows a request message that was previously intercepted and has already been processed by the proxy equipment PXY 300. The proxy equipment PXY 300 can then know whether or not the setting up of the default radio bearer in question has been accepted by the PCRF equipment 124. In a step 455, the proxy equipment PXY 300 sends the intercepted message to the AF equipment 130 via the connection 137.

In a step 456, the PCRF equipment 124 initiates an IP-CAN session establishment procedure concerning the default radio bearer to be set up, with the PGW gateway 125. This procedure is initiated by sending a dedicated message over the connection 158. In the context of LTE technology, the PCRF equipment 124 sends an RAR message via the Gx interface. This message is, as detailed below in relation to FIG. 5, intercepted by the proxy equipment PXY 300.

In a step 457 (as detailed below in relation to FIG. 5), the proxy equipment PXY 300 analyses the information representing the quality-of-service QoS parameters required for said default radio bearer that are contained in said intercepted message, and compares it with the actual capacities of the wireless connection 303, taking account of the radio bearers already set up via said wireless connection 303. The proxy equipment PXY 300 then decides accordingly whether or not said default radio bearer can be set up, in the light of the actual capacities of the wireless connection 303 and under what conditions said default radio bearer can be set up.

If the proxy equipment PXY 300 decides that said default radio bearer cannot be set up in the light of the actual capacities of the wireless connection 303, the proxy equipment PXY 300 rejects the IP-CAN session establishment procedure by responding to the PCRF equipment 124 in place of the PGW gateway. In the context of LTE technology, the proxy equipment PXY 300 rejects the IP-CAN session establishment procedure by sending to the PCRF equipment 124 via the Gx interface an RAA message representing a negative response.

If the proxy equipment PXY 300 decides that said default radio bearer can be set up in the light of the actual capacities of the wireless connection 303, the proxy equipment PXY 300 optionally modifies the information representing the quality-of-service QoS parameters required for said default radio bearer that are contained in said intercepted message, in order to adjust them to the actual capacities of the wireless connection 303. Next, in a step 458, the proxy equipment PXY 300 sends the message, optionally modified to take into account the actual capacities of the wireless connection 303, to the PGW gateway 125 via the connection 158.

In a step 459, the PGW gateway 125 sets up the resources necessary for the establishment of an IP-CAN session for the user equipment UE in question. In other words, the PGW gateway 125 implements the quality-of-service policy application operations (QoS policy enforcement) by means of its PCEF component, matching the requirements of the default radio bearer concerned.

In a step 460, the PGW gateway 125 sends an acknowledgement message to the PCRF equipment 124 via the connection 158 in order to confirm the establishment of the IP-CAN session. In the context of LTE technology, the PGW gateway 125 sends an RAA message via the Gx interface. Although intended for the PCRF equipment 124, this acknowledgement message is intercepted by the proxy equipment PXY 300. The proxy equipment PXY 300 detects that the intercepted message is an acknowledgement message, which therefore follows a request message that was previously intercepted and has already been processed by the proxy equipment PXY 300. The proxy equipment PXY 300 can then know whether or not the setting up of the default radio bearer in question has been accepted by the PGW gateway 125. Next, in a step 461, the proxy equipment PXY 300 sends the message to the PCRF equipment 124 via the connection 158.

In a step 462, the PGW gateway 125 instructs the establishment of the session, and therefore of the default bearer in question, following messages from the PGW gateway 125 to the user equipment UE 100, passing through the SGW gateway 123, the MME entity 122 and the eNB base station 111. This set of operations is shown schematically by a single arrow (462) in FIG. 4B for reasons of simplification.

Next, in a step 463, signaling is established between the PGW gateway 125 and the user equipment UE 100.

It should be noted that a setting up of one or more dedicated radio bearers can also be initiated in the context of the session creation as described above, either by the AF equipment 130, or by the user equipment UE 100.

Figure 5:
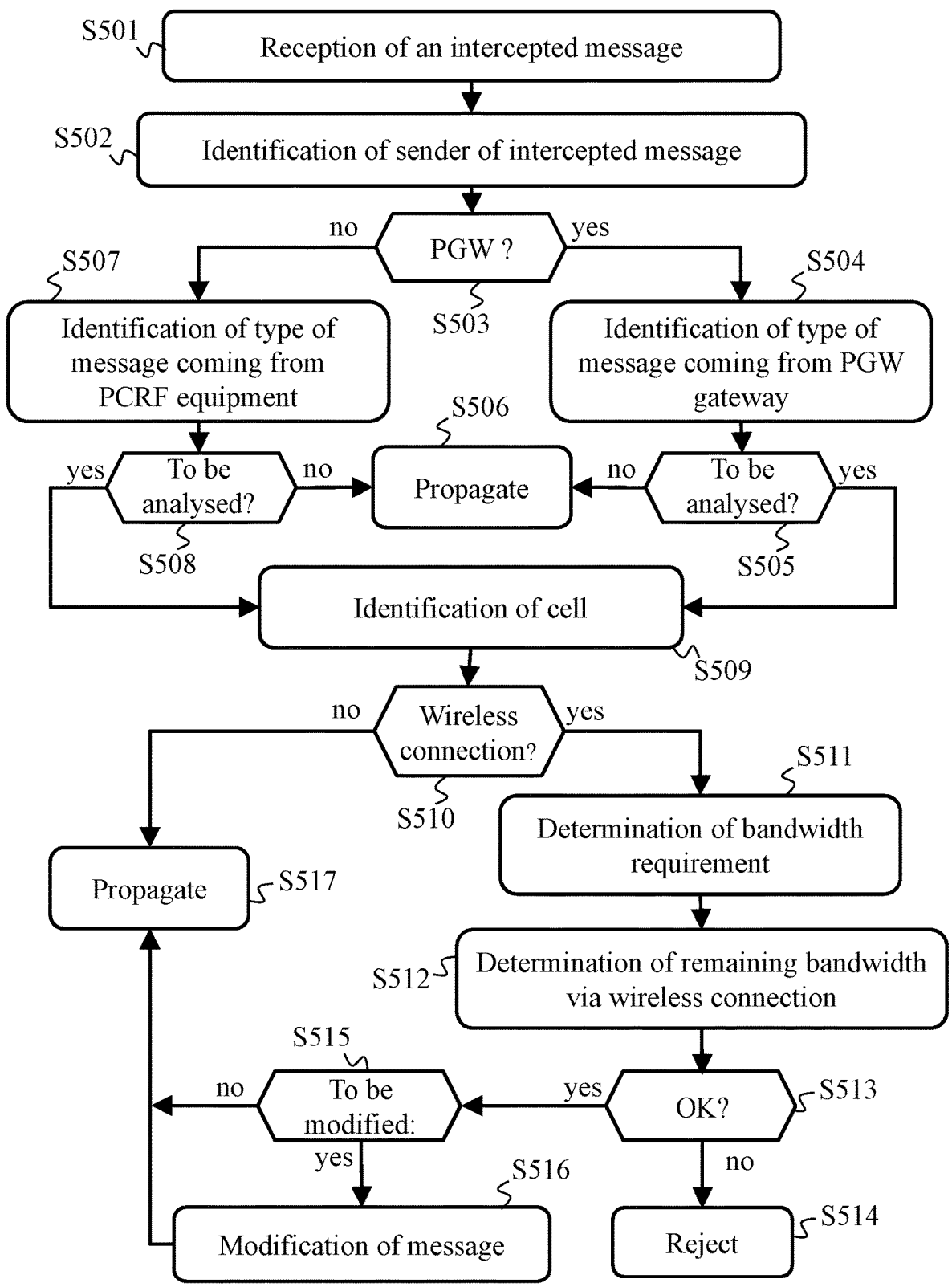
FIG. 5 illustrates schematically a first algorithm implemented by proxy equipment in the cellular telecommunication system in FIG. 3 for processing first intercepted messages.

FIG. 5 illustrates schematically an algorithm implemented by the proxy equipment PXY 300 for processing messages intercepted on the connection 158 by the proxy equipment PXY 300.

In a step S501, the proxy equipment PXY 300 receives a message. This message is intercepted on the connection 158 by the proxy equipment PXY 300. In the context of LTE technology, the message received at step S501 was intercepted by the proxy equipment PXY 300 on the Gx interface.

In a step S502, the proxy equipment PXY 300 identifies which is the original transmitter of the message received at step S501. The IP address of the original transmitter of the message received at step S501 is the source IP address of said message. Through configuration on installation, the proxy equipment PXY 300 has knowledge of the IP address of the PCRF equipment 124 and of the IP address of the PGW gateway 125, and is therefore in a position to determine which is the original transmitter.

In a step S503, the proxy equipment PXY 300 checks that the message received at step S501 was initially sent by the PGW gateway 125. If such is the case, a step S504 is performed; otherwise a step S507 is performed.

In step S504, the proxy equipment PXY 300 determines the type of message received at step S501 coming from the PGW gateway 125. This is because the PGW gateway 125 communicates with the PCRF equipment 124 via the connection 158 in various contexts. To take into account the actual capacities of wireless connections used for deploying respective eNBs base stations, the proxy equipment PXY 300 is concerned more particularly with the session establishment request messages with regard to the setting up of default radio bearers, and with the session update request messages with regard to the setting up of dedicated radio bearers and with regard to the updating of radio bearers already set up. The proxy equipment PXY 300 may also be concerned with acknowledgement (or response) messages corresponding to these requests, in order to know whether or not the PGW gateway 125 has accepted said requests, as already mentioned in relation to FIG. 4A. This aspect is not detailed any further in the context of FIG. 5.

In the context of LTE technology, the proxy equipment PXY 300 is concerned here more particularly with the CCR messages that are sent by the PGW gateway 125 to the PCRF equipment 124.

In a step S505, the proxy equipment PXY 300 checks that the message received at step S501 is a session establishment request message or a session update request message. In the context of LTE technology, the proxy equipment PXY 300 checks that the message received at step S501 is a CCR message concerning a session establishment request or a session update request. If such is the case, a step S509 is performed; otherwise a step S506 is performed, in which the proxy equipment PXY 300 sends said message to the PCRF equipment 124 via the connection 158 (which ends the algorithm in FIG. 5). It should be noted that, in the case of a session establishment request message coming from the PGW gateway 125 that then represents an attachment of the user equipment UE concerned, the proxy equipment PXY 300 is capable of determining, in the content of the message received at step S501, in which cell the user equipment UE concerned is located. The proxy equipment PXY 300 can keep track of it, or inform the orchestration device mentioned above in relation to FIG. 3 of it. It should also be noted that, in the case of a session update request message coming from the PGW gateway 125, the proxy equipment PXY 300 is also capable of determining, in the content of the message received at step S501, in which cell the user equipment UE concerned is located. The proxy equipment PXY 300 can keep track of it, or inform the orchestration device mentioned above in relation to FIG. 3 of it.

In step S507, the proxy equipment PXY 300 determines the type of message received at step S501 coming from the PCRF equipment 124. This is because the PCRF equipment 124 communicates with the PGW gateway 125 via the connection 158 in various contexts. To take into account the actual capacities of the wireless connections used for deploying respective eNBs base stations, the proxy equipment PXY 300 is concerned more particularly with the session establishment request messages with regard to the setting up of default radio bearers and with regard to the setting up of dedicated radio bearers, and with the session update request messages with regard to the updating of radio bearers already set up. The proxy equipment PXY 300 can also be concerned with acknowledgement (or response) messages corresponding to these requests, in order to know whether or not the PCRF equipment 124 has accepted said requests, as already mentioned in relation to FIG. 4A. This aspect is not detailed any further in the context of FIG. 5.

In the context of LTE technology, the proxy equipment PXY 300 is concerned here more particularly with the CCA messages that are sent by the PGW gateway 125 to the PCRF equipment 124 in the context of "piggy-back" mode and with the RAR messages that are sent by the PGW gateway 125 to the PCRF equipment 124 when the session establishment or modification results from a request from the AF equipment 130.

In a step S508, the proxy equipment PXY 300 checks that the message received at step S501 is a session establishment request message or a session update request message. In the context of LTE technology, the proxy equipment PXY 300 checks that the message received at step S501 is a CCA message or an RAR message (as mentioned above), concerning a session establishment request or a session update request. If such is the case, step S509 is performed; otherwise step S506 is performed, in which the proxy equipment PXY 300 sends said message to the PGW gateway 125 via the connection 158 (which ends the algorithm in FIG. 5).

In step S509, the proxy equipment PXY 300 determines in which cell of the EPS cellular telecommunication system the user equipment UE to which the message received at step S501 relates is located. Let us consider that the user equipment UE in question is the user equipment UE 100. The message received by the proxy equipment PXY 300 at step S501 indicates in which cell of the EPS cellular communication system the user equipment UE 100 to which the message received at step S501 relates is located, i.e., identifies the eNB base station 111 via which the user equipment UE 100 accesses the services of the EPS cellular telecommunication system.

In a step S510, the proxy equipment PXY 300 checks whether the cell in the EPS cellular telecommunication system where the user equipment UE 100 to which the message received at step S501 is located is remotely linked by means of a wireless connection. This is the case with the eNB base station 111, which is remotely linked by means of the wireless connection 303. The proxy equipment PXY 300 has pre-established knowledge of the cells that are remotely linked by means of such wireless connections. This knowledge can be supplied by the orchestration device mentioned above in relation to FIG. 3. If said cell is remotely linked by a wireless connection, a step S511 is performed; otherwise a step S517 is performed, in which the proxy equipment PXY 300 sends said message via the connection 158 to the PCRF equipment 124 (which ends the algorithm in FIG. 5).

In step S511, the proxy equipment PXY 300 determines a bandwidth requirement expressed by quality-of-service QoS information included in the message received at step S501.

In the context of LTE technology, the message received at step S501 contains in particular a QCI identifier (QoS class identifier) of a quality-of-service QoS class representing a quality of service QoS and performance level required for each radio bearer concerned. This performance level corresponds to standardized transmission characteristics, including information indicating a resource type (that is to say indicating whether or not the bandwidth must be guaranteed), a priority level, acceptable latency information (referred to as packet delay budget), and information on acceptable packet error/loss rate. Such a priority level is particularly used in the context of the algorithms in FIGS. 7A, 7B and 9. In the context of LTE technology, this priority level is referred to as ARP (Allocation and Retention Priority) and is an integer value lying between 1 and 15, where 1 represents the highest priority level and 15 represents the lowest priority level.

The message received at step S501 also, in particular, contains uplink maximum bit rate information, here called MBR-UL (maximum bit rate/uplink), as well as downlink maximum bit rate information, here called MBR-DL (maximum bit rate/downlink), for the radio bearer in question.

When the radio bearer in question is a dedicated radio bearer, the message received at step S501 contains, in particular, information indicating whether said message concerns a modification to the characteristics of an existing dedicated radio bearer or a setting up of a new dedicated radio bearer. This information is particularly used in a step S512 described below.

When the radio bearer in question is a dedicated radio bearer with a guaranteed bit rate GBR, the message received at step S501 contains in particular also uplink guaranteed bit rate GBR information, here referred to as GBR-UL (guaranteed bit rate/uplink), and downlink guaranteed bit rate GBR information, here referred to as GBR-DL (guaranteed bit rate/downlink), for the dedicated radio bearer in question. This information is particularly used in a step S513 described below.

The proxy equipment PXY 300 therefore deduces, from the quality-of-service QoS information included in the message received at step S501, what is the bandwidth requirement for each radio bearer concerned, here referred to as EBW (expected bandwidth).

When the proxy equipment PXY 300 manages to obtain, via the connection 307, information on the actual capacities of the wireless connection 303 that are separate for uplink and downlink, the bandwidth requirement EBW is expressed separately between the uplink (EBW-UL) and the downlink (EBW-DL), as follows:

EBW={EBW-UL; EBW-DL} with EBW-UL=MBR-UL and EBW-DL=MBR-DL.

When the proxy equipment PXY 300 obtains, via the connection 307, information on the actual capacities of the wireless connection 303 combined in uplink and downlink, the bandwidth requirement EBW is expressed conjointly for the uplink and downlink, as follows:

EBW=MBR-UL+MBR-DL

In a step S512, the proxy equipment PXY 300 determines a remaining bandwidth RBW on the wireless connection used for remotely linking the eNB base station concerned, i.e., the eNB base station 111 for the user equipment UE 100. The remaining bandwidth RBW is determined as follows:

RBW=WLBW−UBW where WLBW (wireless link bandwidth) represents the bandwidth of the wireless connection used for remotely linking the eNB base station concerned and UBW (used bandwidth) represents a bandwidth used on said wireless connection by the radio bearers that have been set up and have not been closed. The proxy equipment PXY 300 obtains information representing the bandwidth WLBW of the wireless connection 303 by sending a corresponding request via the connection 307 and receiving a response including said information via said connection 307. The proxy equipment PXY 300 obtains information representing the used bandwidth UBW either by keeping track of the setting ups of radio bearers and closures of radio bearers by means of the messages intercepted on the connections 157 and 158, or by interrogating the orchestration device mentioned above in relation to FIG. 3.

When the proxy equipment PXY 300 manages to obtain, via the connection 307, information on actual capacities of the wireless connection 303 that are separate with respect to uplink and downlink, the remaining bandwidth RBW is expressed separately between the uplink (RBW-UL) and the downlink (RBW-DL), the bandwidth WLBW is also expressed separately between the uplink (WLBW-UL) and the downlink (WLBW-DL), and the used bandwidth UBW is also expressed separately between the uplink (UBW-UL) and the downlink (UBW-DL), as follows:

RBW={RBW-UL; RBW-DL}
WLBW={WLBW-UL; WLBW-DL}
UBW={UBW-UL; UBW-DL}
with
RBW-UL=WLBW-UL−UBW-UL and RBW-DL=WLBW-DL−UBW-DL Therefore, when the proxy equipment PXY 300 obtains, via the connection 307, information on actual capacities of the wireless connection 303 combined with respect to uplink and downlink, the remaining bandwidth RBW is expressed as follows:

RBW=RBW-UL+RBW-DL

When the message received at step S501 contains, in particular, information indicating whether said message concerns a modification of the characteristics of an existing dedicated radio bearer, the used bandwidth UBW is reduced, for calculating the remaining bandwidth RBW, by the maximum bit rates MBR-UL and MBR-DL that had previously been used for defining said existing dedicated radio bearer.

In a particular embodiment, the remaining bandwidth RBW (potentially through the bandwidth WLBW offered by the wireless connection in question) is decreased by a predefined margin c. This predefined margin c makes it possible to absorb variations in remaining bandwidth RBW (due, for example, to variations in climatic conditions) without there being any impact on the radio bearers set up. In addition, this predefined margin c makes it possible to anticipate decreases in the bandwidth WLBW offered by the wireless connection in question (due, for example, to a degradation in climatic conditions) that would require degrading or even closing radio bearers set up. This aspect is detailed hereinafter in relation to FIGS. 7A, 7B and 9.

In step S513, the proxy equipment PXY 300 checks whether the bandwidth requirement EBW represented by the message received at step S501 can be covered by the remaining bandwidth determined at step S512. If such is the case, which signifies that EBW≤RBW (or that EBW-UL≤RBW-UL and EBW-DL≤RBW-DL) and that the message received at step S501 does not need to be modified in order to take into account the actual capacities of the wireless connection concerned, then a step S515 is performed; otherwise the proxy equipment PXY 300 determines a modified value MMBR-DL of the maximum downlink bit rate MBR-DL and a modified value MRMBR-UL of the maximum uplink bit rate MBR-UL, in order to adapt the required bandwidth to the actual capacities of the wireless connection concerned.

When the proxy equipment PXY 300 manages to obtain, via the connection 307, information on actual capacities of the wireless connection 303 that are separate with respect to uplink and downlink, the modified values MMBR-DL and MMBR-UL are defined as follows:

MMBR-DL=[MBR-DL*RBW-DL/EBW-DL]
MMBR-UL=[MBR-UL*RBW-UL/EBW-UL]
where [ . . . ] represents the default integer part operation (the "floor").

Otherwise the modified values MMBR-DL and MMBR-UL are defined as follows:

MMBR-DL=[MBR-DL*RBW/EBW]
MMBR-UL=[MBR-UL*RBW/EBW]

If the modified value MMBR-DL is strictly less than the guaranteed downlink bit rate GBR-DL (as indicated in the message received at step S501) and/or if said modified value MMBR-UL is strictly less than the guaranteed uplink bit rate GBR-UL (as indicated in the message received at step S501), then a step S514 is performed; otherwise the message received at step S501 needs to be modified in order to take into account the actual capacities of the wireless connection concerned, and step S515 is performed.

In step S514, the proxy equipment PXY 300 considers that the bandwidth requirement EBW represented by the message received at step S501 cannot be covered by the remaining bandwidth RBW determined at step S512. The proxy equipment PXY 300 rejects the request represented by the message received at step S501 and transmits a negative response to the original sender of the message received at step S501 without informing the initially targeted destination of the message received at step S501 of this.

In order to transmit this negative response, the proxy equipment PXY 300 emulates a sending on the connection 158. In the context of LTE technology, said negative response is therefore transmitted on the Gx interface: if the message received at step S501 is a CCR message that has been transmitted by the PGW gateway 125, the proxy equipment PXY 300 transmits in response, to the PGW gateway 125, a CCA message representing a negative response; if the message received at step S501 is a CCA message that has been transmitted by the PCRF equipment 124 (piggy-back mode), the proxy equipment PXY 300 can in response transmit, to the PCRF equipment 124, a message (e.g., a CCR message) representing a negative response; and the message received at step S501 is an RAR message that has been transmitted by the PCRF equipment 124 (following a request from the AF equipment 130, the proxy equipment PXY 300 in response transmits, to the PCRF equipment 124, an RAA message representing a negative response.

In a particular embodiment, before concluding that it has to respond negatively to the original sender of the message received at step S501, the proxy equipment PXY 300 can seek to recover bandwidth by degrading or closing radio bearers already set up, in order to increase said remaining bandwidth RBW by reducing said used bandwidth UBW. This aspect is addressed hereinafter in relation to FIGS. 7A, 7B and 9. Execution of step S514 ends the algorithm in FIG. 5.

In step S515, the proxy equipment PXY 300 checks whether, following step S513, the message received at step S501 needs to be modified in order to take into account the actual capacities of the wireless connection concerned. If such is the case, a step S516 is performed; otherwise step S517 is performed, in which the proxy equipment PXY 300 sends said message via the connection 158 to the initially targeted destination of the message received at step S501 (which ends the algorithm in FIG. 5).

In step S516, the proxy equipment PXY 300 modifies the message received at step S501, in order to take into account the actual capacities of the wireless connection concerned, replacing the value of the maximum downlink bit rate MBR-DL with the modified value MMBR-DL and replacing the value of the maximum uplink bit rate MBR-UL with the modified value MMBR-UL. Thus, the proxy equipment PXY 300 modifies the message received at step S501 by indicating therein a bandwidth requirement of no more than the remaining bandwidth via the wireless connection concerned.

Next step S517 is performed, in which the proxy equipment PXY 300 sends said message, after modification in order to take into account the actual capacities of the wireless connection concerned, via the connection 158 to the initially targeted destination of the message received at step S501 (which ends the algorithm in FIG. 5).

Figure 6:
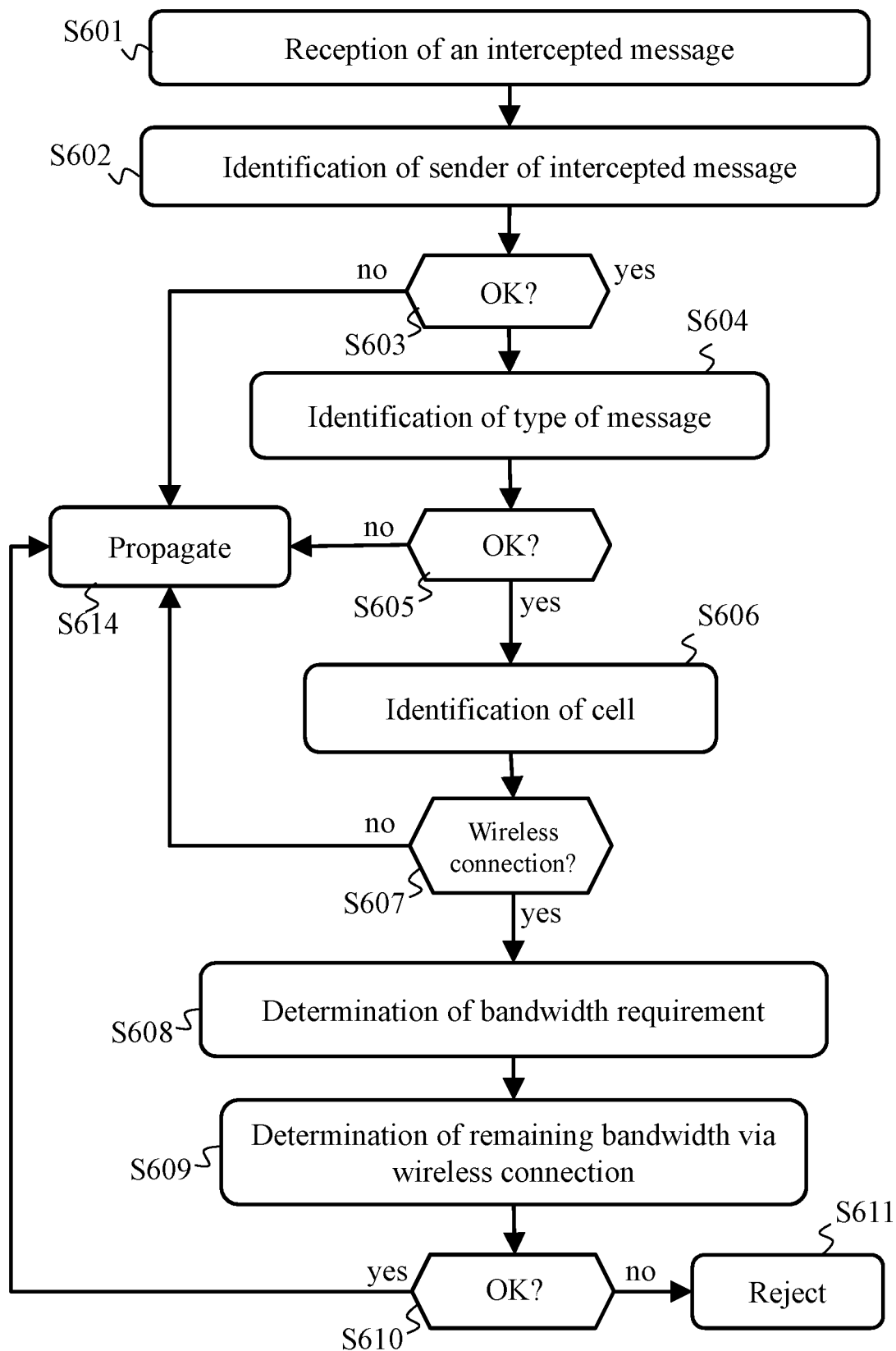
FIG. 6 illustrates schematically a second algorithm implemented by the proxy equipment for processing second intercepted messages.

FIG. 6 illustrates schematically an algorithm implemented by the proxy equipment PXY 300 for processing messages intercepted on the connection 157 by the proxy equipment PXY 300

In a step S601, the proxy equipment PXY 300 receives a message. This message is intercepted on the connection 157 by the proxy equipment PXY 300. In the context of LTE technology, the message received at step S501 was intercepted by the proxy equipment PXY 300 on the Rx interface.

In a step S602, the proxy equipment PXY 300 identifies which is the original sender of the message received at step S601. The IP address of the original sender of the message received at step S601 is the source IP address of said message. By configuration on installation, the proxy equipment PXY 300 has knowledge of the IP address of the AF equipment 130 and of the IP address of the PCRF equipment 124, and is therefore in a position to determine which is the original sender.

In a step S603, the proxy equipment PXY 300 checks that the message received at step S601 was initially sent by the AF equipment 130. If such is the case, a step S604 is performed; otherwise a step S614 is performed, in which the proxy equipment PXY 300 sends said message to the PCRF equipment 124 via the connection 157 (which ends the algorithm in FIG. 6).

In step S604, the proxy equipment PXY 300 determines the type of message received at step S601. This is because the AF equipment 130 and the PCRF equipment 124 communicate via the connection 157 in order to exchange information in various contexts. To take into account the actual capacities of wireless connections used for deploying respective eNBs base stations, the proxy equipment PXY 300 is concerned more particularly with the session establishment request messages, with regard to the setting up of default radio bearers, and with the session update request messages with regard to the setting up of dedicated radio bearers and with regard to the updating of radio bearers already set up. The proxy equipment PXY 300 may also be concerned with acknowledgement (or response) messages corresponding to these requests, in order to know whether or not the PCRF equipment 124 has accepted said requests, as already mentioned in relation to FIG. 4B. This aspect is not detailed any further in the context of FIG. 6.

In the context of LTE technology, the proxy equipment PXY 300 is concerned here more particularly with the AAR messages that are sent by the AF equipment 130 to the PCRF equipment 124.

In a step S605, the proxy equipment PXY 300 checks that the message received at step S601 is a session establishment request message or a session update request message. If such is the case, a step S606 is performed; otherwise step S614 is performed, in which the proxy equipment PXY 300 sends the message to the PCRF equipment 124 via the connection 157 (which ends the algorithm in FIG. 6).

In step S606, the proxy equipment PXY 300 determines in which cell in the EPS cellular telecommunication system the user equipment UE to which the message received at step S601 relates is located. Let us consider that the user equipment UE in question is the user equipment UE 100. The message received at step S601 does not explicitly indicate the cell in which the user equipment UE in question is located, since the AF equipment does not have knowledge of such information. A session establishment or update initiated by the AF equipment 130 does, however, require in advance an attachment of the user equipment UE in question. The proxy equipment PXY 300 has kept track of this or has informed the orchestration device previously mentioned in relation to FIG. 3 of it.

In a step S607, the proxy equipment PXY 300 determines whether the cell in the EPS cellular telecommunication system where the user equipment UE 100 to which the message received at step S601 relates is located is remotely linked by means of a wireless connection. This is the case with the eNB base station 111, which is remotely linked by means of the wireless connection 303. If said cell is remotely linked by a wireless connection, a step S608 is performed; otherwise step S614 is performed, in which the proxy equipment PXY 300 sends said message to the PCRF equipment 124 via the connection 157 (which ends the algorithm in FIG. 6).

In step S608, the proxy equipment PXY 300 determines a bandwidth requirement expressed by quality-of-service QoS information included in the message received at step S601.

The message received at step S601 contains in particular a quality-of-service QoS class identifier QCI representing a quality-of-service QoS performance level required for the radio bearer concerned, as already described in relation to FIG. 5.

The message received at step S601 also, in particular, contains maximum uplink bit rate information MBR-UL, as well as maximum downlink bit rate information MBR-DL, for the radio bearer in question.

The proxy equipment PXY 300 therefore deduces, from the quality-of-service QoS information included in the message received at step S601, what the bandwidth requirement EBW is, determined as in the context of FIG. 5.

The message received at step S601, in particular, also contains information on minimum bandwidth required in uplink, here referred to as LRB-UL (low requested bandwidth/uplink), as well as information on minimum bandwidth required in downlink, here referred to as LRB-DL (low requested bandwidth/downlink), for the radio bearer in question. It should be noted that this information is not present in the messages processed in the context of the algorithm in FIG. 5 since, unlike the AF equipment 130, the PCRF equipment 124 has knowledge of the rules of subscription of the user of the user equipment UE to which the radio bearer in question relates.

Thus, in a step S608, the proxy equipment PXY 300 determines a bandwidth requirement expressed in the form of a minimum bandwidth MBR required.

When the proxy equipment PXY 300 manages to obtain, via the connection 307, information on actual capacities of the wireless connection 303 that are separate in terms of uplink and downlink, the minimum bandwidth MBW is determined as follows:

MBW={MBW-UL; MBW-DL} with MBW-UL=LRB-UL and MBW-DL=LRB-DL

When the proxy equipment PXY 300 obtains, via the connection 307, information on actual capacities of the wireless connection 303 combined in terms of uplink and downlink, the minimum bandwidth MBW is determined as follows:

MBW=LRB-UL+LRB-DL

In step S609, the proxy equipment PXY 300 determines a remaining bandwidth RBW on the wireless connection used for remotely linking the eNB base station concerned, i.e. the eNB base station 111 for the user equipment UE 100. This remaining bandwidth RBW is determined as in the context of FIG. 5.

In step S610, the proxy equipment PXY 300 checks whether the bandwidth requirement represented by the message received at step S601 can be covered by the remaining bandwidth determined at step S609. If such is the case, which means that MBW RBW and that the message received at step S601 does not need to be modified, then a step S612 is performed; otherwise the proxy equipment PXY 300 determines a modified value MMBR-DL of the maximum downlink bit rate MBR-DL and a modified value MMBR-UL of the maximum uplink bit rate MBR-UL, as in the context of FIG. 5.

If the remaining bandwidth RBW is greater than or equal to the minimum bandwidth MBW, then step S614 is performed, in which the proxy equipment PXY 300 sends said message to the PCRF equipment 124 via the connection 157 (which ends the algorithm in FIG. 6); otherwise step S611 is performed.

In step S611, the proxy equipment PXY 300 considers that the bandwidth requirement represented by the message received at step S601 cannot be covered by the remaining bandwidth determined at step S609. The proxy equipment PXY 300 rejects the request emanating from the AF equipment 130 and transmits a negative response to the AF equipment 130 without informing the PCRF equipment 124 of this, which means that the message received at step S601 is not propagated to the PCRF equipment 124. To transmit this negative response, the proxy equipment PXY 300 emulates a sending of said negative response by the PCRG equipment 124, the AF equipment 130 then thinking that it has received said negative response from the PCRF equipment 124. In the context of LTE technology, said negative response is an AAA message sent via the Rx interface. In a particular embodiment, before deciding that it has to respond negatively to the AF equipment 130, the proxy equipment PXY 300 may seek to recover bandwidth by degrading already set up radio bearers, in order to increase said remaining bandwidth RBW by reducing said used bandwidth UBW. This aspect is addressed hereinafter in relation to FIGS. 7A, 7B and 9. Execution of step S611 ends the algorithm in FIG. 6.

The algorithm in FIG. 6 thus makes it possible to avoid the PCRF equipment 124 having to process a request emanating from the AF equipment 130 that could not be satisfied in the light of the actual capacities of a wireless connection used for remotely linking an eNB base station involved in said request.

Next, if the session establishment request message or the session update request message is accepted by the proxy equipment PXY 300, the PCRF equipment 120 can accept or refuse the session establishment or the session update, according to the quality-of-service QoS policies provided by the user concerned (and therefore the user equipment UE concerned). If the PCRF equipment 124 accepts, the quality of service QoS authorized for this user may be greater than that requested by the AF equipment 130, that is to say, the guaranteed bandwidth granted by the PCRF equipment 124 may be greater than what is requested by the AF equipment 130. In this case, the proxy equipment PXY 300 may have to modify the quality-of-service QoS information in subsequent messages exchanged between the PCRF equipment 124 and the PGW gateway 125 via the connection 158, in order to take into account the actual capacities of a wireless connection involved. This aspect has already been detailed in relation to FIG. 5.

Figure 7A:
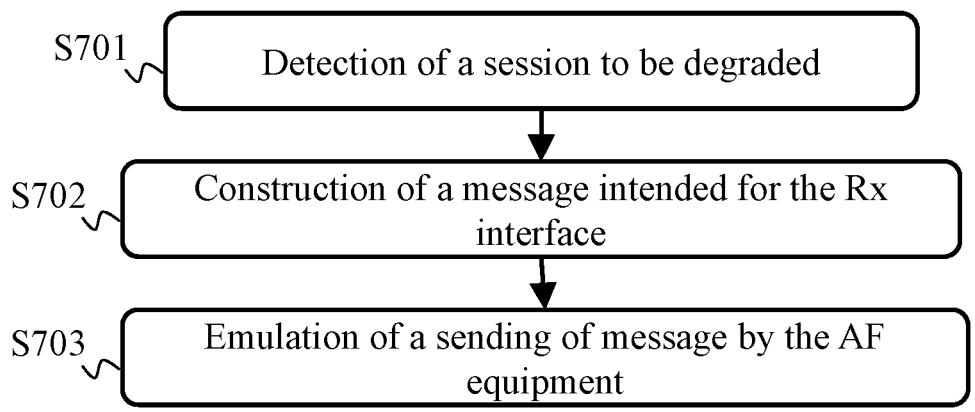
FIGS. 7A and 7B illustrate schematically algorithms implemented by the proxy equipment for releasing bandwidth in the cellular telecommunication system in FIG. 3.
Figure 7B:
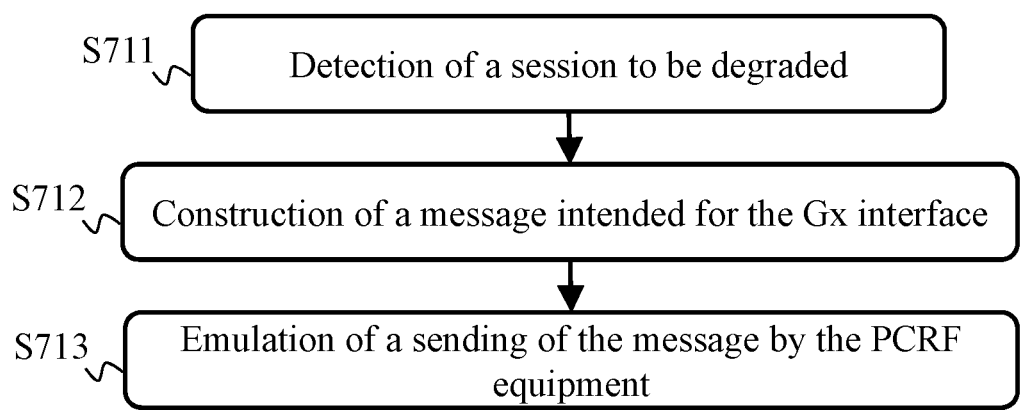
Figure 9:
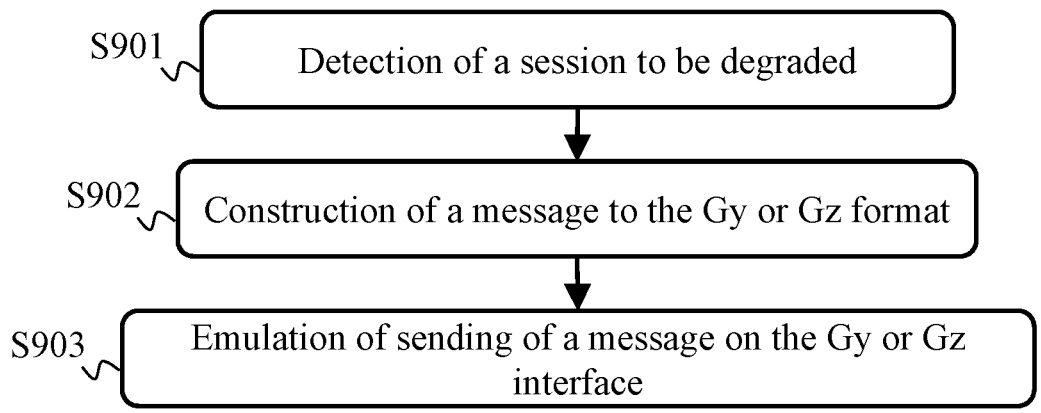
FIG. 9 illustrates schematically another algorithm implemented by the proxy equipment for releasing bandwidth in the cellular telecommunication system in FIG. 8A and/or FIG. 8B.

FIGS. 7A and 7B, and also FIG. 9, illustrate schematically algorithms implemented by the proxy equipment PXY 300 for releasing bandwidth in the EPS cellular telecommunication system. As indicated previously in relation to FIGS. 5 and 6, this makes it possible to be able to accept new radio bearers or to increase the guaranteed bandwidth for radio bearers already set up, whereas, as it stands, the wireless connection 303 does not have sufficient remaining bandwidth RBW to do this.

FIG. 7A illustrates schematically a first embodiment.

In a step S701, the proxy equipment PXY 300 detects that a session is to be degraded, that is to say, that the guaranteed bandwidth associated with one or more radio bearers of said session must be reduced, or that this session is to be closed. For example, said session is associated with a lower priority level than the radio bearer that the EPS cellular telecommunication system seeks to establish or modify (in the context of the algorithm in FIG. 5 or FIG. 6). One or more criteria other than the priority level may be used to find one or more radio bearers to degrade or close, and it may be that the question of the priority level is secondary.

Said session must be degraded or closed so as to make it possible, optionally in addition to a degradation or closure of one or more other sessions, for the remaining bandwidth RBW on the wireless connection 303 to make it possible to accept the setting up of the new radio bearer in question or the modification of the already set up radio bearer in question. Such a session degradation may consist of closing one or more radio bearers of said session.

In a step S702, the proxy equipment PXY 300 constructs accordingly a session update request message vis-à-vis the session to be degraded or a message closing said session. The session update request message includes information on corresponding quality of service QoS resulting from the degradation to be applied. In particular, the session update request message includes information on maximum bit rates MBR-UL and MBR-DL corresponding to the bandwidth allocated previously to the radio bearer concerned reduced by the required bandwidth degradation.

In a step S703, the proxy equipment PXY 300 emulates a sending, by the AF equipment 130, of the session update request message constructed at step S702, the PCRF equipment 124 then thinking that it is receiving the session update request message from the AF equipment 130. In the context of LTE technology, said message is therefore an AAR message transmitted via the Rx interface in the context of a session degradation and said message is an STR (session termination request) message transmitted via the Rx interface in the context of a session closure. It should be noted that STR messages are defined by the Diameter protocol, more particularly in the normative document RFC 4005.

FIG. 7B illustrates schematically a second embodiment.

In a step S711, the proxy equipment PXY 300 detects that a session is to be degraded, that is to say, that the guaranteed bandwidth associated with one or more radio bearers of said session must be decreased, or that said session is to be closed. Step S711 is identical to step S701.

In a step S712, the proxy equipment PXY 300 constructs accordingly a session update request message vis-à-vis the session to be degraded or a message closing said session. The session update request message includes information on corresponding quality of service QoS resulting from the degradation to be applied. In particular, the session update request message includes information on maximum bit rates MBR-UL and MBR-DL corresponding to the bandwidth allocated previously to the radio bearer concerned reduced by the required bandwidth degradation.

In a step S713, the proxy equipment PXY 300 emulates a sending, by the PCRF equipment 124, of the session update request message constructed at step S712 or of the session closure message, the PGW gateway 125 thinking therefore that it is receiving the session update request message or session closure message from the PGW gateway 125. In the context of LTE technology, said message is therefore an RAR message transmitted via the Gx interface.

In a particular embodiment, the proxy equipment PXY 300 intercepts any acknowledgement message transmitted by the PGW gateway 125 in response to the message transmitted at step S713. In the context of LTE technology, said message is an RAA message transmitted by the PGW gateway 125 via the Gx interface.

Figure 8A:
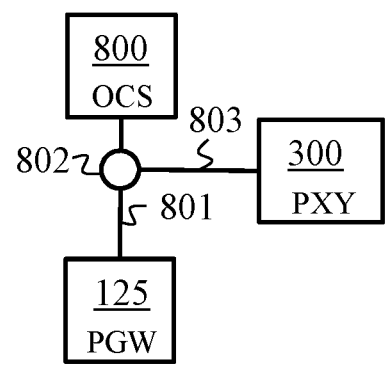
FIGS. 8A and 8B illustrate schematically two alternatives, complementary to the cellular telecommunication system in FIG. 3.

FIG. 8A illustrates schematically an addition to the EPS cellular telecommunication system as depicted in FIG. 3.

In the diagram in FIG. 8A, the PGW gateway 125 is connected to an on-line charging system OCS 800 via a connection 801.

As already indicated, in the context of LTE technology, the interfaces (and therefore the message formats applicable)—also referred to as reference points according to LTE technology terminology—between the various elements constituting the EPS cellular telecommunication system are standardized. In particular, the interface between the PGW gateway 125 and the on-line charging system OCS 800 is called Gy and is defined in the 3GPP specification TS 32.240 "Telecommunication management; Charging management; Charging architecture and principles" and the 3GPP specification TS 32.299 "Telecommunication management; Charging management; Diameter charging applications".

The connection 801 is a logic connection. This means that network equipment is typically present on this connection 801 in order to provide the transmissions of IP packets in which all the messages exchanged are encapsulated. Thus, as shown in FIG. 8A, the proxy equipment PXY 300 is connected, via a connection 803, to a third item of network equipment (e.g. router or switch) 802 present on the connection 801.

In a particular embodiment, the proxy equipment PXY 300 intercepts messages that pass over the connection 801. The EPS cellular telecommunication system is such that the PGW gateway 125 has knowledge of the IP address of the on-line charging system OCS 800, and vice versa. For the proxy equipment PXY 300 to be in a position to emulate sendings of messages by the on-line charging system OCS 800 (as described hereinafter in relation to FIG. 9), the EPS cellular telecommunication system is such that the IP address of the PGW gateway 125 is replaced by the IP address of the proxy equipment PXY 300 with the on-line charging system OCS 800, and the IP address of the on-line charging system OCS 800 is replaced by the IP address of the proxy equipment PXY 300 with the PGW gateway 125. The on-line charging system OCS 800 thus believes that it is exchanging messages with the PGW gateway 125 whereas, in fact, the on-line charging system OCS 800 is exchanging these messages with the proxy equipment PXY 300. Especially, the PGW gateway 125 thus believes that it is exchanging messages with the on-line charging system OCS 800 whereas, in fact, the PGW gateway 125 is exchanging these messages with the proxy equipment PXY 300.

It should therefore be noted that the presence of the third item of network equipment 802 on the connection 801 is not strictly necessary.

In a variant embodiment, the third item of network equipment 802 is configured to divert, to the proxy equipment PXY 300, the messages passing over the connection 801. For example, the third item of network equipment 802 has a dedicated connection with the proxy equipment PXY 300, for example in the form of a tunnel. The third item of network equipment 802 then encapsulates and transmits via this respective tunnel any incoming message. The third item of network equipment 802 de-encapsulates any message issuing from this tunnel and propagates it as if the message had not been diverted to the proxy equipment PXY 300. It is thus not necessary to deceive the PGW gateway 125 about the IP address of the on-line charging system OCS 800, nor to deceive the on-line charging system OCS 800 about the IP address of the PGW gateway 125.

Figure 8B:
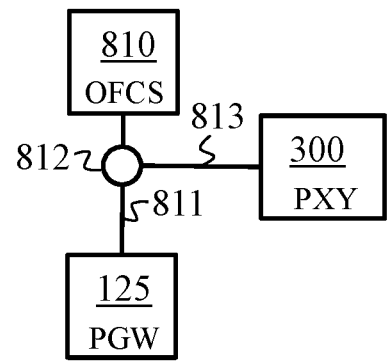

FIG. 8B illustrates schematically an addition to the EPS cellular telecommunication system as depicted in FIG. 3, in a variant to the arrangement presented above in relation to FIG. 8A. It should be noted that the arrangements in FIGS. 8A and 8B can be implemented in the same EPS cellular telecommunication system.

On the diagram in FIG. 8B, the PGW gateway 125 is connected to an off-line charging system OFCS 810 via a connection 811.

As already indicated, in the context of LTE technology, the interfaces (and therefore the applicable message formats)—also referred to as reference points according to LTE technology—between the various elements constituting the EPS cellular telecommunication system are standardized. In particular, the interface between the PGW gateway 125 and the on-line charging system OCS 800 is called Gz and is defined in the 3GPP specification TS 23.234 "3GPP system to Wireless Local Area Network (WLAN) interworking; System description" and the 3GPP specification TS 29.234 "3GPP system to Wireless Local Area Network (WLAN) interworking; Stage 3".

The connection 811 is a logic connection. This means that network equipment is typically present on this connection 811 in order to provide the transmissions of IP packets in which the messages exchanged are encapsulated. Thus, as shown in FIG. 8B, the proxy equipment PXY 300 is connected, via a connection 813, to a fourth item of network equipment (e.g., router or switch) 812 present on the connection 811.

In a particular embodiment, the proxy equipment PXY 300 intercepts messages that pass over the connection 811. The EPS cellular telecommunication system is such that the PGW gateway 125 has knowledge of the IP address of the off-line charging system OFCS 810, and vice versa. For the proxy equipment PXY 300 to be in a position to emulate sendings of messages by the off-line charging system OFCS 810 (as described below in relation to FIG. 9), the EPS cellular telecommunication system is such that the IP address of the PGW gateway 125 is replaced by the IP address of the proxy equipment PXY 300 with the off-line charging system OFCS 810, and the IP address of the off-line charging system OFCS 800 is replaced by the IP address of the proxy equipment PXY 300 with the PGW gateway 125. The off-line charging system OCS 810 thus believes that it is exchanging messages with the PGW gateway 125 whereas, in fact, the off-line charging system OFCS 800 is exchanging these messages with the proxy equipment PCY 300. And especially, the PGW gateway 125 thus believes that it is exchanging messages with the off-line charging system OFCS 810 whereas, in fact, the PGW gateway 125 is exchanging these messages with the proxy equipment PXY 300.

It should therefore be noted that the presence of the fourth item of network equipment 812 on the connection 811 is not strictly necessary.

In a variant embodiment, the fourth item of network equipment 812 is configured to divert, to the proxy equipment PXY 300, the messages passing over the connection 811. For example, the fourth item of network equipment 812 has a dedicated connection with the proxy equipment PXY 300, for example in the form of a tunnel. The fourth item of network equipment 812 then encapsulates and transmits, via this respective tunnel, any incoming message. The fourth item of network equipment 812 de-encapsulates any message issuing from this tunnel and propagates it as if the message had not been diverted to the proxy equipment PXY 300. It is thus not necessary to deceive the PGW gateway 125 about the IP address of the off-line charging system OFCS 810, nor to deceive the off-line charging system OFCS 810 about the IP address of the PGW gateway 125.

Unlike the messages intercepted on the connection 158 and any messages intercepted on the connection 157 for which the proxy equipment PXY 300 makes an inspection in order to know the type of each message intercepted (see the algorithms in FIGS. 5 and 6), the proxy equipment PXY 300 merely sends the messages intercepted on the connection 801 and/or on the connection 811 to their respective destinations initially targeted. The arrangements shown schematically in FIGS. 8A and 8B do however enable the proxy equipment PXY 300 to emulate sendings of messages by the on-line charging system OCS 800 and/or by the off-line charging system OFCS 810, as described below in relation to FIG. 9.

FIG. 9 illustrates schematically a variant embodiment of the algorithms in FIGS. 7A and 7B, in which a session must be closed in order to release bandwidth. FIG. 9 relies on one or other or both of the arrangements illustrated schematically in FIGS. 8A and 8B.

In a step S901, the proxy equipment PXY 300 detects that a session is to be closed, that is to say that the guaranteed bandwidth associated with one or more radio bearers of said session must be released. Step S901 is identical to step S701, but vis-à-vis a session to be closed.

In a step S902, the proxy equipment PXY 300 constructs a session closure request message, vis-à-vis said session, for lack of credit.

In a step S903, the proxy equipment PXY 300 emulates a sending, by the on-line charging system OCS 800, of the lack-of-credit session closure message that was constructed at step S902, the PGW gateway 125 then thinking that it is receiving said message from the on-line charging system OCS 800. In the context of LTE technology, said message is an ASR (abort session request) message sent asynchronously over the Gy interface. It should be noted that ASR messages are defined by the Diameter protocol, more particularly, in the normative document RFC 4005.

In a variant embodiment of step S903, the proxy equipment PXY 300 emulates a sending, by the off-line charging system OFCS 810, of the session closure message constructed at step S902, the PGW gateway 125 then thinking that it is receiving said message from the off-line charging system OFCS 810. In the context of LTE technology, said message is an ASR message sent asynchronously over the Gz interface.

In the context of LTE technology, it is also possible to close said session synchronously by modifying a response from the on-line charging system OCS 800 in regular exchanges between the PGW gateway 125 and the on-line charging system OCS 800. This is because the PGW gateway 125 regularly transmits, to the on-line charging system OCS 800 via the Gy interface, CCR messages intended to provide the on-line charging system OCS 800 with consumption information relating to said session. The on-line charging system OCS 800 responds thereto by sending CCA messages via the Gy interface. The proxy equipment PXY 300 can then modify one of these CCA messages in order not to enable the continuation of the session (typically using the DIAMETER-AUTHORISATION-REJECTED code).

In the context of LTE technology, it is also possible to close said session synchronously by modifying a response from the off-line charging system OFCS 810 in regular exchanges between the PGW gateway 125 and the off-line charging system OFCS 810. This is because the PGW gateway 125 regularly transmits, to the off-line charging system OFCS 800, via the Gz interface, CCR messages intended to provide the off-line charging system OFCS 800 with the consumption information relating to said session. The off-line charging system OFCS 810 responds thereto by sending CCA messages via the Gz interface. The proxy equipment PXY 300 can then modify one of these CCA messages in order not to enable the continuation of the session (using the DIAMETER-AUTHORIZATION-REJECTED code).

On reception of a message requesting session closure for lack of credit, the PGW gateway 125 informs the PCRF equipment 125 of the closure of the session in question. The exchanges occur between the PGW gateway 125 and the PCRF equipment 124 in the same way as if the closure had been requested by the user equipment UE concerned.

In a particular embodiment, the algorithm in FIG. 7A and/or the algorithm in FIG. 7B and/or the algorithm in FIG. 9 is triggered when the proxy equipment PXY 300 detects a reduction in bandwidth offered by a wireless connection used for remotely linking an eNB base station. This reduction in bandwidth offered by a wireless connection is detected by the proxy equipment PXY 300 by interrogating, via the connection 307, the transceiver device SAT2 302 and/or the transceiver device SAT1 301. The interrogation via the connection 307 is done regularly. This makes it possible to react to reductions in bandwidth on said wireless connection due to changes in climatic conditions in the environment in which said wireless connection is established (e.g., the appearance of fog), by releasing guaranteed bandwidth associated with one or more radio bearers previously set up. Thus, when the bandwidth on said wireless connection reaches a level below a first predefined threshold TH1 beyond the bandwidth used on said wireless connection (the first predefined threshold TH1 being less than the previously mentioned margin c), the proxy equipment PXY 300 seeks to recover previously allocated bandwidth, by executing the algorithm in FIG. 7A and/or the algorithm in FIG. 7B and/or the algorithm in FIG. 9.

In a particular embodiment, the algorithm in FIG. 7A and/or the algorithm in FIG. 7B and/or the algorithm in FIG. 9 is triggered when the proxy equipment PXY 300 detects a reduction in the bandwidth on a slope which, by extrapolation, leads to a passing of said first predefined threshold TH1 before a predefined period of time has elapsed. More particularly, the interrogation via the connection 307 takes place regularly. The proxy equipment PXY 300 effects an extrapolation of the change in the slope, for example by determining an affine straight line passing through a first measurement point at the previous iteration and a second measuring point at the current iteration. By this extrapolation, the proxy equipment PXY 300 estimates what would be the measuring point after the elapse of said predefined period of time (e.g., instant of the next iteration), if the change in the slope remained the same. If this estimated measuring point is lower than the first predefined threshold TH1, then the proxy equipment PXY 300 seeks to recover a previously allocated bandwidth, by executing the algorithm in FIG. 7A and/or the algorithm in FIG. 7B and/or the algorithm in FIG. 9.

Another method for estimating the change in the slope over time consists of sampling the predefined period of time at a predefined step (for example 1/10th or 1/20th) and calculating a mean affine straight line, or at best a curve representing an exponential logarithmic function with degrees greater than or equal to 2, representing the trend of this sampling. Said predefined period of time thus corresponds to a time window, sliding according to said predefined step.

In a particular embodiment, the proxy equipment PXY 300 keeps recordings of the session degradations applied in the context of the algorithm in FIG. 7A or the algorithm in FIG. 7B. This does not concern the sessions that have been closed. Thus, when the proxy equipment PXY 300 detects an increase in bandwidth offered by a wireless connection used for remotely linking an eNB base station (for example because the climatic conditions have improved or because at least one other session has been closed), the proxy equipment PXY 300 may seek to re-increase the bandwidth allocated to at least one session that had previously been degraded. It should be noted that the proxy equipment PXY 300 seeks to re-increase the allocated bandwidth only when said increase in bandwidth offered is such that the bandwidth on said wireless connection reaches a level higher than a second predefined threshold TH2 beyond the bandwidth used on said wireless connection, said second predefined threshold TH2 being higher than the first predefined threshold TH1 (the principle of hysteresis). It should be noted that the second predefined threshold TH2 is higher than the margin c mentioned previously. This re-increase in the bandwidth takes place within the limit fixed by the bandwidth that was allocated to the session in question before application of the degradation. These recordings of session degradations applied in the context of the algorithm in FIG. 7A or the algorithm in FIG. 7B can be stored in the orchestration device mentioned above in relation to FIG. 3. These re-increases in bandwidth allocated are carried out by the proxy equipment PXY 300 by sending session update messages to the PGW gateway 125 via the connection 158, passing itself off as the PCRF equipment 124. In the context of LTE technology, these messages are RAR messages sent via the Gx interface.

Figure 10:
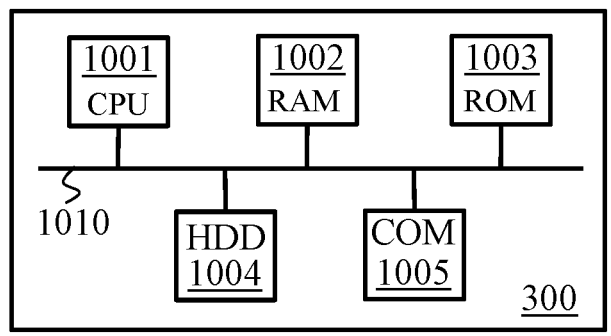
FIG. 10 illustrates schematically an example of hardware architecture of the proxy equipment.

FIG. 10 illustrates schematically an example of hardware architecture of the proxy equipment PXY 300.

The proxy equipment PXY 300 then includes, connected by a communication bus 1010: a processor or CPU (central processing unit) 1001; a random access memory (RAM) 1002; a read only memory (ROM) 1003; a storage unit 1004, such as a hard disk HDD (hard disk drive), or a storage medium reader, such as an SD (secure digital) card reader; and at least one communication interface COM 1005 configured to enable the proxy equipment PXY 300 to communicate in the EPS cellular telecommunication system.

The processor 1001 is capable of executing instructions loaded into the random access memory RAM 1002 from the read only memory ROM 1003, or from an external memory, or from a storage medium, or from a communication network. When the proxy equipment PXY 300 is powered up, the processor 1001 is capable of reading instructions from the random access memory RAM 1002 and executing them. These instructions form a computer program causing the implementation, by the processor 1001, of all or some of the algorithms and steps described above.

All or some of the algorithms and steps described above can thus be implemented in software form by the execution of a set of instructions by a programmable machine, for example a DSP (digital signal processor) or a microprocessor, or be implemented in hardware form by a machine or a dedicated component (chip) or a dedicated set of components (chipset), such as for example an FPGA (field-programmable gate array) component or an ASIC (application-specific integrated circuit) component.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing bandwidth in a cellular telecommunication system comprising:
  a radio access part comprising a plurality of base stations enabling user equipment to access services of the cellular telecommunication system for which radio bearers have to be set up; and
  a core network part comprising quality-of-service policy control equipment connected via a first connection to a gateway via which said radio bearers are set up in order to access said services of the cellular telecommunication system;
  wherein, at least one base station in the plurality of base stations is remotely linked to the core network by a wireless connection, proxy equipment included in the cellular telecommunication system is configured to perform the method comprising:
  intercepting, on said first connection, each session establishment or session update message transmitted between the quality-of-service policy control equipment and the gateway;
    when a first message corresponding to one of each session establishment or session update message transmitted between the quality-of-service policy control equipment and the gateway does not concern a radio bearer involving one of the plurality of base stations remotely linked to the core network by a wireless connection, propagating said first message to its initially targeted destination and, when said first message concerns at least one radio bearer involving one of the plurality of base stations remotely linked to the core network by a wireless connection:

determining a remaining bandwidth via said wireless connection;

when the determined remaining bandwidth covers a bandwidth requirement expressed in said first message, propagating said first message to its initially targeted destination; and, when the determined remaining bandwidth does not cover the bandwidth requirement, refusing, in place of the original destination of said first message, the session establishment or update when the determined bandwidth does not cover a minimum bandwidth to be guaranteed expressed in said first message, and otherwise modifying said first message, before propagating it to its initially targeted destination, indicating a bandwidth requirement no more than the remaining bandwidth.

2. The method according to claim 1, wherein the proxy equipment is configured to intercept any message passing over the first connection:

by replacing, to the gateway, the address of the quality-of-service policy control equipment with the address of the proxy equipment;

by replacing, to the quality-of-service policy control equipment, the address of the gateway with the address of the proxy equipment; and when the proxy equipment propagates any message intercepted on the first connection, the proxy equipment is configured to replace the source address of said message with its own address and the destination address of said message with the address of its initially targeted destination.

3. The method according to claim 1, wherein, the cellular telecommunication system further comprises an application function equipment connected by a second connection to the quality-of-service policy control equipment, the method further comprises:

intercepting on said second connection each session establishment or session update message transmitted from the application function equipment to the quality-of-service policy control equipment;

when a second message corresponding to one of each session establishment or session update message transmitted from the application function equipment to the quality-of-service policy control equipment does not concern a radio bearer involving a base station remotely linked to the core network by a wireless connection, propagating said second message to its initially targeted destination and, when said second message concerns at least one radio bearer involving a base station remotely linked to the core network by a wireless connection:

determining a remaining bandwidth via said wireless connection;

when the determined remaining bandwidth covers a bandwidth requirement expressed in said second message, propagating said second message to its initially targeted destination; and, when the determined remaining bandwidth does not cover the bandwidth requirement, refusing, in place of the original destination of said second message, the session establishment or update.

4. The method according to claim 3, wherein the proxy equipment is configured to intercept any message passing over the second connection:

by replacing, to the application function equipment, the address of the quality-of-service policy control equipment with the address of the proxy equipment;

by replacing, to the quality-of-service policy control equipment, the address of the application function equipment with the address of the proxy equipment; and when the proxy equipment propagates any message intercepted on the second connection, the proxy equipment is configured to replace the source address of said message with its own address and the destination address of said message with the address of its initially targeted destination.

5. The method according to claim 4, wherein, before rejecting a session establishment or update, the proxy equipment seeks to degrade or close one or more radio bearers passing via said wireless connection, by emulating a sending, by the application function equipment, respectively a session update message or a session closure message intended for the quality-of-service policy control equipment.

6. The method according to claim 1, wherein, said wireless connection being established between a first transceiver device and a second transceiver device, the proxy equipment determines the remaining bandwidth via said wireless connection by performing:

interrogating at least one of the first transceiver device or the second transceiver device to obtain actual bandwidth information on said wireless connection;

determining a bandwidth used via said wireless connection according to radio bearers previously set up via said wireless connection; and deducing the remaining bandwidth from the actual bandwidth of said wireless connection and the bandwidth used via said wireless connection.

7. The method according to claim 1, wherein, before rejecting a session establishment or update, the proxy equipment seeks to degrade or close one or more radio bearers passing via said wireless connection, by emulating a sending, by the quality-of-service policy control equipment, respectively of a session update message or of a session closure message intended for the gateway.

8. The method according to claim 1, wherein, the cellular telecommunication system further comprising an on-line charging system connected to said gateway via a third connection, before rejecting a session establishment or update, the proxy equipment seeks to close one or more radio bearers passing via said wireless connection, by emulating a sending, by the on-line charging system, of a session closure message for lack of credit intended for the gateway.

9. The method according to claim 1, wherein, the cellular telecommunication system further comprising an off-line charging system connected to said gateway via a fourth connection, before rejecting a session establishment or update, the proxy equipment seeks to close one or more radio bearers passing via said wireless connection, by emulating a sending, by the off-line charging system, of a session closure message for lack of credit intended for the gateway.

10. The method according to claim 1, wherein, when the proxy equipment modifies a session establishment message or a session update message, the proxy equipment keeps a margin of bandwidth with respect to the remaining bandwidth, and the proxy equipment seeks to at least one of degrade or close one or more radio bearers when the proxy equipment detects a drop in remaining bandwidth on said wireless connection below a first predefined threshold lower than said margin.

11. The method according to claim 1, wherein, when the proxy equipment modifies a session establishment message or a session update message, the proxy equipment keeps a margin of bandwidth with respect to the remaining bandwidth, and the proxy equipment seeks to at least one of degrade or close one or more radio bearers when the proxy equipment detects a drop in remaining bandwidth that follows a slope leading, within a predefined period of time, to a remaining bandwidth estimated to be below a first predefined threshold lower than said margin.

12. The method according to claim 11, wherein the proxy equipment seeks to at least one of improve or restore one or more radio bearers previously degraded by the proxy equipment, when the proxy equipment detects an increase in remaining bandwidth on the wireless connection above a second predefined threshold higher than said margin.

13. The method according to claim 1, wherein the cellular telecommunication system is of the LTE type and wherein said wireless connection is a satellite connection.

14. Proxy equipment intended to be integrated in a cellular telecommunication system, the cellular telecommunication system comprising:
    a radio access part comprising a plurality of base stations enabling user equipment to access services of the cellular telecommunication system for which radio bearers have to be set up; and
    a core network part comprising quality-of-service policy control equipment connected via a first connection to a gateway via which said radio bearers are set up for accessing said services of the cellular telecommunication system;
    wherein, at least one base station being remotely linked to the core network by a wireless connection, the proxy equipment comprises:
        electronics circuitry configured for:
            intercepting, on said first connection, each session establishment or session update message transmitted between the quality-of-service policy control equipment and the gateway;
            when said message does not concern a radio bearer involving a base station remotely linked to the core network by a wireless connection, propagating said message to its initially targeted destination, and,
            when said message concerns at least one radio bearer involving a base station remotely linked to the core network by a wireless connection:
                determining a remaining bandwidth via said wireless connection;
                when the determined remaining bandwidth covers a bandwidth requirement expressed in said message, propagating said message to its initially targeted destination; and,
                when the determined remaining bandwidth does not cover the bandwidth requirement, refusing, in place of the original destination of said message, the establishment or updating of a session when the determined bandwidth does not cover a minimum bandwidth to be guaranteed expressed in said message, and otherwise modifying said message, before propagating it to its initially targeted destination, indicating a bandwidth requirement of no more than the remaining bandwidth.

15. A cellular telecommunication system comprising:
    a radio access part comprising a plurality of base stations enabling user equipment to access services of the cellular telecommunication system for which radio bearers have be set up; and
    a core network part comprising quality-of-service policy control equipment connected via a first connection to a gateway via which said radio bearers are set up for accessing said services of the cellular telecommunication system;
    wherein, at least one base station being remotely linked to the core network by a wireless connection, said system includes the proxy equipment according to claim 14.

* * * * *